United States Patent
Liu

(10) Patent No.: US 11,729,509 B2
(45) Date of Patent: Aug. 15, 2023

(54) 360-DEGREE PANORAMIC IMAGE SELECTIVE DISPLAYING CAMERA AND METHOD

(71) Applicant: MAGIC CONTROL TECHNOLOGY CORP., New Taipei (TW)

(72) Inventor: Pei-Chung Liu, New Taipei (TW)

(73) Assignee: Magic Control Technology Corp., New Taipei (TW)

( * ) Notice: Subject to any disclaimer, the term of this patent is extended or adjusted under 35 U.S.C. 154(b) by 0 days.

(21) Appl. No.: 16/907,727

(22) Filed: Jun. 22, 2020

(65) Prior Publication Data
US 2021/0368098 A1 Nov. 25, 2021

(30) Foreign Application Priority Data
May 22, 2020 (TW) .................................. 109117241

(51) Int. Cl.
*H04N 23/698* (2023.01)
*G06T 1/20* (2006.01)
(Continued)

(52) U.S. Cl.
CPC ........... *H04N 23/698* (2023.01); *G03B 17/12* (2013.01); *G03B 37/02* (2013.01); *G03B 37/04* (2013.01);
(Continued)

(58) Field of Classification Search
CPC ........... H04N 5/23238; H04N 5/23245; H04N 5/2254; H04N 5/2252; G03B 37/04
See application file for complete search history.

(56) References Cited

U.S. PATENT DOCUMENTS 5,073,824 A * 12/1991 Vertin .............. G08B 13/19632
348/E5.042
8,859,922 B1 * 10/2014 Sage .................... H03K 17/975
200/600
(Continued)

FOREIGN PATENT DOCUMENTS

| JP | 6621798 B2 | 12/2019 |
| TW | I558208 B | 11/2016 |
| TW | I637355 B | 10/2018 |

*Primary Examiner* — Kathleen V Nguyen
(74) *Attorney, Agent, or Firm* — Rosenberg, Klein & Lee

(57) ABSTRACT

Disclosed are a 360-degree panorama image selective displaying camera and method, including a 360-degree panoramic image camera body that is provided, on an outside thereof, with at least one wide-angle lens module and a triggering section, at least one image displaying processing unit arranged inside the 360-degree panoramic image camera body, and a displaying-position triggering sensing mechanism. The image displaying processing unit is connected to the wide-angle lens module to process and output a 360-degree panorama image photographed and captured by the wide-angle lens module. The displaying-position triggering sensing mechanism corresponds to the triggering section of the 360-degree panoramic image camera body, so that a pressing touch applied externally to the triggering section causes the displaying-position triggering sensing mechanism to detect the pressing touch position and direction of the triggering section and generate a triggering-position selection sensing signal to the image displaying processing unit, and the image displaying processing unit is allowed to correspondingly and selectively retrieve, enlarge, cut, and stitch a selectively retrieved image, which corresponds to the pressing touch position and direction of the triggering section, among the photographed subjects, to the primitive 360-degree panorama image as a combined output.

30 Claims, 15 Drawing Sheets

(51) Int. Cl.
  *G03B 37/02*   (2021.01)
  *G03B 37/04*   (2021.01)
  *G03B 17/12*   (2021.01)
  *H04N 23/51*   (2023.01)
  *H04N 23/55*   (2023.01)
  *H04N 23/667*  (2023.01)

(52) U.S. Cl.
  CPC ............... *G06T 1/20* (2013.01); *H04N 23/51* (2023.01); *H04N 23/55* (2023.01); *H04N 23/667* (2023.01)

(56) References Cited

U.S. PATENT DOCUMENTS

| | | | |
|---|---|---|---|
| 9,635,254 B2 | 4/2017 | Guo et al. | |
| 2003/0220971 A1* | 11/2003 | Kressin | H04N 7/148 709/204 |
| 2008/0242377 A1* | 10/2008 | Lee | H04M 1/0277 455/575.1 |
| 2011/0115689 A1* | 5/2011 | Sugiyama | H04W 8/005 345/2.3 |
| 2017/0341235 A1* | 11/2017 | Baloch | B25J 9/162 |
| 2019/0080505 A1* | 3/2019 | Yeung | G09G 5/346 |
| 2019/0087581 A1* | 3/2019 | Kim | G06F 8/65 |
| 2019/0347775 A1* | 11/2019 | Suitoh | G06T 3/0062 |
| 2020/0007749 A1* | 1/2020 | Izuoka | G06F 3/04883 |
| 2021/0281771 A1* | 9/2021 | Yang | G11B 27/031 |

\* cited by examiner

360-DEGREE PANORAMIC IMAGE SELECTIVE DISPLAYING CAMERA AND METHOD

BACKGROUND OF THE INVENTION

1. Field of the Invention

The present invention relates to a 360-degree panorama image selective displaying camera and a method, and in particular to a camera and a method thereof, which includes a 360-degree panoramic image camera body that is provided, on the outside thereof, with at least one triggering section that is touchable and depressible to make selection, through touching and pressing, of an image, among photographed subjects, which corresponds to the touch in respect of direction and position, for enlarging, retrieving, cutting, and stitching the image to a 360-degree panorama image as a combined output.

2. The Related Arts

A known 360-degree panoramic camera has been widely used in applications of 360-degree panoramic photographing of images, particularly commercial meetings and conferences having multiple participants, where the 360-degree panoramic camera allows all participants to be photographed and recorded with the lens of the camera and a panorama would be provided to allow a terminal or an electronic device having a displaying function to display the 360-degree full-view panoramic image. However, a conventional way of displaying a 360-degree panoramically photographed image is just the above-described way of simply displaying the 360-degree full-view panoramic image, and for an application where multiple participants are involved in a meeting, it only needs for a speaker or a specific subject, among the participants, to whom attention may be specifically paid to be displayed, in a fully tracked and magnified or enlarged form, in combination with the 360-degree full-view panoramic image. The known 360-degree panoramic camera adopts a complicated and expensive equipment, such as an artificial intelligent system to identify biological features or to recognize voices of the participants in order to identify and select a specific target among the subjects participating the meeting for subsequent image retrieving, enlarging, and stitching to the 360-degree full-view panoramic image for displaying through a combined output. This makes the known 360-degree panoramic camera bulky in size and requires addition of external image processing equipment, such that in addition to the high cost, it also requires high-speed computation wide-band networking communication, with the networking communication being connected to other high-speed computation, processing image, and artificial intelligent computer equipment or image processing equipment, this leading to problems and drawbacks of inconvenience of installing and operating the 360-degree panoramic camera, making the known 360-degree panoramic camera very constrained in respect of applications and operations thereof, and thus reducing and lowering the industrial value and economic value thereof. This is an issue to be overcome for the known 360-degree panoramic cameras.

Related patent documents such as Japan patent 6621798 disclose a typical example of method and device that are of complicated operation and high cost of image processing, which becomes problematic when used in a known 360-degree panoramic camera system for image processing to retrieve, enlarge, cut, and display a specific person among photographed subjects and would suffers the same issues of difficulty of installation and operation and high cost of installation and construction and would suffer the problems of the above-described known 360-degree panoramic camera in specifying and selecting a photographed subject for retrieving, enlarging, and stitching and increasing the size of the 360-degree panoramic camera, requiring external image processing equipment, expensive equipment, and needing additional high-speed computation wide-band network and networking equipment connection to other external high-speed operation, image processing and artificial intelligence computer equipment or image processing equipment, making the operation complicated and inconvenient, leading to problems and drawbacks of not meeting the requirement of industrial use and economic efficiency.

Further, U.S. Pat. No. 9,635,254 provides a panoramic scene capturing and browsing mobile device, system and method, which discloses another typical example of technology of retrieving and displaying based on a 360-degree panoramic camera, which uses a motion detection module of a mobile device for detection and complicated application program operation device to retrieve and display a synthetic full-view image. Similarly, in addition to high equipment cost and installation cost of application program that the known 360-degree panoramic camera suffers, such a wearable panoramic photographic device does not suit for application of meetings that involve multiple participants and can only be used for application of personal portable panoramic photographing, and thus greatly limiting the scope of application and industrial economic value.

In addition, Taiwan Patent Gazette Publication 1637355 and 1558208 disclose teachings of 360-degree panorama image retrieving and displaying processing that suffers requirement of complicated software operation, hardware facility, and high equipment cost that the conventional 360-degree panoramic camera suffers, and also suffers the problems of the conventional 360-degree panoramic camera, when used in application for retrieving, enlarging, and stitching an image of a specific or selected photographed subject, in respect of bulky size and requirement of external image processing equipment, high cost facility, and additional high-speed computation wide-band network and networking equipment connection to other external high-speed operation, image processing and artificial intelligence computer equipment or image processing equipment, making the operation complicated and inconvenient, leading to problems and drawbacks of not meeting the requirement of industrial use and economic efficiency.

SUMMARY OF THE INVENTION

The primary objective of the present invention is to provide a 360-degree panoramic image selective displaying camera and method that eliminate the drawbacks of the prior art 360-degree panoramic cameras in applications of image retrieving, enlarging, and stitching of a specific or selected photographed subject where the prior art 360-degree panoramic camera may have a bulky size or requires use in combination with external image processing facility and may need very high equipment cost or requires additional installation of high-speed operation wide-bank networks, network communication connection with external computer facility or image processing facility of high-speed operation, image processing, and artificial system, making the operation complicated and inconvenient, adverse to industrial utilization and economic efficiency.

Thus, the present invention provides a 360-degree panorama image selective displaying camera, which comprises:

a 360-degree panoramic image camera body, which is provided, on an outside thereof, with at least one wide-angle lens module and a triggering section, the wide-angle lens module being operable to photograph and acquire a 360-degree panorama image, the triggering section being arranged to cover and correspond to a range of photographing angle of the wide-angle lens module and being operable through pressing touch by a user;

at least one image displaying processing unit, which is arranged inside the 360-degree panoramic image camera body and is connected to the wide-angle lens module of the 360-degree panoramic image camera body to process an output of the 360-degree panorama image photographed and captured by the wide-angle lens module; and at least one displaying-position triggering sensing mechanism, which is arranged inside the 360-degree panoramic image camera body and is connected to the image displaying processing unit, the displaying-position triggering sensing mechanism being arranged to correspond to the triggering section of the 360-degree panoramic image camera body, so that a pressing touch operation occurs outside and is applied to the triggering section causes the displaying-position triggering sensing mechanism to detect pressing touch position and direction of the triggering section and generates a triggering-position selection sensing signal to the image displaying processing unit, to allow the image processing unit to correspondingly and selectively retrieve, enlarge, cut, and stitch a selectively retrieved image, among the photographed subjects, that corresponds to the pressing touch position and direction of the triggering section to the primitive 360-degree panorama image photographed and acquired by the 360-degree panoramic image camera body as a combined output.

Further, in the above 360-degree panorama image selective displaying camera, the 360-degree panoramic image camera body comprises:

at least one base, the base having an upper end having two sides that are each provide with at least one connection arm; and at least one photographing section, the photographing section having two ends that are rotatably connected between the connection arms of the two sides of the upper end of the base, the wide-angle lens module and the triggering section being each arranged on an outer peripheral portion of the photographing section, the image displaying processing unit and the displaying-position triggering sensing mechanism being each arranged inside the photographing section, wherein the photographing section is positioned at a horizontal angle through being rotated upwards so that the wide-angle lens module is operable for 360-degree wide-angle photographing, the triggering section being operable as being touched and pressed by a user's finger on a horizontal plane.

In the above-described 360-degree panorama image selective displaying camera, the photographing section of the 360-degree panoramic image camera body is provided, on an outside thereof, with at least one power button and a mode selection button.

In the above-described 360-degree panorama image selective displaying camera, the wide-angle lens module of the 360-degree panoramic image camera body comprises a fisheye lens module.

In the above-described 360-degree panorama image selective displaying camera, the wide-angle lens module of the 360-degree panoramic image camera body comprises a multi-lens module.

In the above-described 360-degree panorama image selective displaying camera, the triggering section of the 360-degree panoramic image camera body is of an annular form that is arranged to surround an outer circumference of the wide-angle lens module.

In the above-described 360-degree panorama image selective displaying camera, the triggering section of the 360-degree panoramic image camera body comprises conductive rubber.

In the above-described 360-degree panorama image selective displaying camera, the triggering section of the 360-degree panoramic image camera body comprises non-conductive rubber.

In the above-described 360-degree panorama image selective displaying camera, the image displaying processing unit is connected to at least one display device.

In the above-described 360-degree panorama image selective displaying camera, the display device to which the image displaying processing unit is connected comprises computer equipment with a displaying unit.

In the above-described 360-degree panorama image selective displaying camera, the display device to which the image displaying processing unit is connected comprises a notebook computer.

In the above-described 360-degree panorama image selective displaying camera, the display device to which the image displaying processing unit is connected comprises a tablet computer.

In the above-described 360-degree panorama image selective displaying camera, the display device to which the image displaying processing unit is connected comprises projection equipment.

In the above-described 360-degree panorama image selective displaying camera, the display device to which the image displaying processing unit is connected comprises an LCD displaying device.

In the above-described 360-degree panorama image selective displaying camera, the display device to which the image displaying processing unit is connected comprises a smart mobile device.

In the above-described 360-degree panorama image selective displaying camera, the image displaying processing unit comprises:

at least one image processor, which functions to process the 360-degree panorama image;

at least one processor, which assists the image processor for output or input control and processing of data of the 360-degree panorama image;

at least one memory, which is connected to the image processor and the processor to provide temporary data storage and buffering of image data output and input to the image processor and the processor;

at least one input interface, which is connected to the memory, the wide-angle lens module of the 360-degree panoramic image camera body, and the displaying-position triggering sensing mechanism for input of the 360-degree panorama image photographed and acquired by the wide-angle lens module and the triggering-position selection sensing signal outputted from the displaying-position triggering sensing mechanism; and at least one output interface, which is connected to the memory and at least one display device to output the primitive 360-degree panorama image or a 360-degree panorama image of a selectively retrieved image of the photographed subject corresponding to the pressing touch position and direction of the triggering section, which is processed and outputted by the image processor, to the display device for displaying.

In the above-described 360-degree panorama image selective displaying camera, the image processor of the image displaying processing unit comprises a graphics processing unit (GPU).

In the above-described 360-degree panorama image selective displaying camera, the image processor of the image displaying processing unit comprises an image processing integrated circuit having functions of special graphics, image processing engine, image dewarping, and stitching.

In the above-described 360-degree panorama image selective displaying camera, the input interface of the image displaying processing unit comprises a USB interface.

In the above-described 360-degree panorama image selective displaying camera, the input interface of the image displaying processing unit comprises an MIPI (Mobile Industry Processor Interface) interface.

In the above-described 360-degree panorama image selective displaying camera, the input interface of the image displaying processing unit comprises an $I^2C$ (Inter-Integrated Circuit) interface.

In the above-described 360-degree panorama image selective displaying camera, the input interface of the image displaying processing unit comprises an $I^2S$ (Inter-IC sound, I2S) interface.

In the above-described 360-degree panorama image selective displaying camera, the input interface of the image displaying processing unit comprises an UART (Universal Asynchronous Receiver/Transmitter) interface.

In the above-described 360-degree panorama image selective displaying camera, the output interface of the image displaying processing unit comprises a USB interface.

In the above-described 360-degree panorama image selective displaying camera, the output interface of the image displaying processing unit comprises an $I^2S$ interface.

In the above-described 360-degree panorama image selective displaying camera, the output interface of the image displaying processing unit comprises a wireless USB interface, which is connected, in a wireless manner, to at least one wireless display device.

In the above-described 360-degree panorama image selective displaying camera, the displaying-position triggering sensing mechanism comprises:

at least one corresponding image direction sensing unit, which is formed of a plurality of image direction sensing elements, each of the image direction sensing elements is located under and corresponds to an underside of the triggering section of the 360-degree panoramic image camera body, so that the pressing touch applied to the triggering section triggers at least one of the image direction sensing elements to detect and generate and output a primary direction sensing signal; and at least one direction calculation unit, which is connected to the corresponding image direction sensing unit and the image displaying processing unit, so as calculate a corresponding direction corresponding to the pressing touch position of triggering section according to the primary direction sensing signal outputted from the corresponding image direction sensing unit and generate a triggering-position selection sensing signal outputted to the image displaying processing unit.

In the above-described 360-degree panorama image selective displaying camera, the image direction sensing elements of the corresponding image direction sensing unit each comprise a switch element.

In the above-described 360-degree panorama image selective displaying camera, the image direction sensing elements of the corresponding image direction sensing unit each comprise a capacitance sensing element.

A 360-degree panorama image selective displaying method, comprises the following steps:

(A) identifying if a primary direction sensing signal is triggered and generated, wherein detection is made as to if at least one triggering section that is arranged outside a 360-degree panoramic image camera body that is operable to photograph and acquire a 360-degree panorama image is subjected to a pressing touch operation applied by a user, and wherein when the triggering section is touched and pressed down by the user, at least one corresponding image direction sensing units of at least one displaying-position triggering sensing mechanism arranged inside the 360-degree panoramic image camera body is triggered and generates and outputs at least one primary direction sensing signal, and if yes, executing Step (B), and if not, repeating Step (A);

(B) reading the primary direction sensing signal, wherein at least one direction calculation unit of the displaying-position triggering sensing mechanism arranged inside the 360-degree panoramic image camera body of Step (A) reads the primary direction sensing signal generated by the corresponding image direction sensing unit as being detected through triggering in Step (A);

(C) calculating and acquiring a triggering-position selection sensing signal corresponding to a direction of pressing touch, wherein the direction calculation unit of the displaying-position triggering sensing mechanism of Step (B) calculates and acquires a triggering-position selection sensing signal corresponding to pressing touch direction and position of the triggering section outside the 360-degree panoramic image camera body of Step (A); and (D) making an output of a combination, through cutting and stitching, of a primitive panoramic image and an image of a selected direction, wherein at least one image displaying processing unit arranged inside the 360-degree panoramic image camera body of Step (A) is operable, according to the triggering-position selection sensing signal that is calculated and acquired by the direction calculation unit of Step (C), to retrieve, enlarge, and cut an image of a photographed subject corresponding to a pressing touch position of the triggering section of Step (A) in the panoramic photograph taken by the 360-degree panoramic image camera body, in order to form at least one selectively retrieved image, for being then stitched to and combined with the primitive 360-degree panorama image photographed and acquired by the 360-degree panoramic image camera body of Step (A) for combined output, and repeating Step (A).

Further, a 360-degree panorama image selective displaying method, comprises the following steps:

(a) displaying mode input selection, wherein at least one pressing touch operation is applied to a mode selection button arranged outside a 360-degree panoramic image camera body that is operable to photograph and acquire a 360-degree panorama image to input and select a mode of output of a primitive 360-degree panorama image or to output a selected direction subject image mode that the image of the selected photographed subject is stitched to the primitive 360-degree panorama image for output;

(b) identifying if the selected direction subject image mode is selected for output, wherein at least one image displaying processing unit arranged inside the 360-degree panoramic image camera body of Step (a) detects and determines if the mode selection button of Step (a) is touched and pressed down to select output of the primitive 360-degree panorama image mode or to select output of the selected direction subject image mode in which the photographed subject image is stitched to the primitive 360-degree panorama image for output, if yes, executing Step (c), and if not, executing Step (b1);

(b1) outputting the primitive 360-degree panorama image, wherein direct outputting is made for the primitive 360-degree panorama image photographed and acquired by the 360-degree panoramic image camera body of Step (a) to be directly outputted by the image displaying processing unit of Step (b), and repeating Step (a);

(c) identifying if a primary direction sensing signal is triggered and generated, wherein detection is made as to if a triggering section arranged outside the 360-degree panoramic image camera body of Step (a) is subjected to a pressing touch operation applied by a user, and wherein when the triggering section is touched and pressed down by the user, at least one corresponding image direction sensing unit of at least one displaying-position triggering sensing mechanism arranged inside the 360-degree panoramic image camera body is triggered and generates and outputs at least one primary direction sensing signal, and if yes, executing Step (d), and if not repeating Step (c);

(d) reading the primary direction sensing signal, wherein at least one direction calculation unit of the displaying-position triggering sensing mechanism arranged inside the 360-degree panoramic image camera body of Step (c) reads the primary direction sensing signal generated by the corresponding image direction sensing unit as being detected through triggering in Step (c);

(e) calculating and acquiring a triggering-position selection sensing signal corresponding to a direction of pressing touch, wherein the direction calculation unit of the displaying-position triggering sensing mechanism of Step (d) calculates and acquires a triggering-position selection sensing signal corresponding to pressing touch direction and position of the triggering section outside the 360-degree panoramic image camera body of Step (c); and (f) making an output of a combination, through cutting and stitching, of a primitive panoramic image and an image of a selected direction, wherein at least one image displaying processing unit arranged inside the 360-degree panoramic image camera body of Step (c) is operable, according to the triggering-position selection sensing signal that is calculated and acquired by the direction calculation unit of Step (e), to retrieve, enlarge, and cut an image of a photographed subject corresponding to a pressing touch position of the triggering section of Step (c) in the panoramic photograph taken by the 360-degree panoramic image camera body, in order to form at least one selectively retrieved image, for being then stitched to and combined with the primitive 360-degree panorama image photographed and acquired by the 360-degree panoramic image camera body of Step (c) for combined output, and repeating Step (a).

The efficacy of the 360-degree panorama image selective displaying camera and method according to the present invention is as follows. The arrangement of the triggering section on the 360-degree panoramic image camera body allows a user to directly touch and press down and the arrangement of the displaying-position triggering sensing mechanism enables detection and selection to be made, according to the position and direction of the touch applied by the user to the triggering section, in respect of the one of photographed subjects that, among the photographed subjects, is at the direction and position in a 360-degree panorama image taken by a wide-angle lens module of the 360-degree panoramic image camera body, followed by having an image of the one photographed subject that corresponds to the pressing touch position and direction of the triggering section to be correspondingly and selectively retrieved, enlarged, cut, and stitched, as a selectively retrieved image, by using the image displaying processing unit to the primitive 360-degree panorama image photographed and acquired by the 360-degree panoramic image camera body as a combined output. The operation can be carried out with simple and straightforward touching and pressing for selection making, allowing efficient and immediate (real-time) combination of the image of the one photographed subject that corresponds, in position and direction, in the 360-degree panorama image taken by the wide-angle lens module of the 360-degree panoramic image camera body, to the selection so made to a primitive 360-degree panorama image for output to and displayed on a display device, and there is no need for complicated and high-cost artificial system and software, complicated image processing circuit or application programs, so that the installation and expenditure of facility can be greatly reduced and simplified. Particularly, an operation of selection can be easily done through touching and pressing down a pressing touch section at a desired direction, and as such, no skilled or complicated operation is required. Further, when not in use, the photographing section of the 360-degree panoramic image camera body can be rotated to stow between the connection arms of two sides of an upper end of the base to greatly reduce the amount of space required for stowage of the 360-degree panoramic image camera body and could completely eliminate the problems and drawbacks of the above-described prior art 360-degree panorama image camera in applications to selection of an image among photographed subjects for combination with a primitive 360-degree panoramic image and also exhibit advantages of low cost, easy operation, and compact size that would help improve industrial value and enhance industrial utilization.

DETAILED DESCRIPTION OF THE PREFERRED EMBODIMENTS

Figure 1:
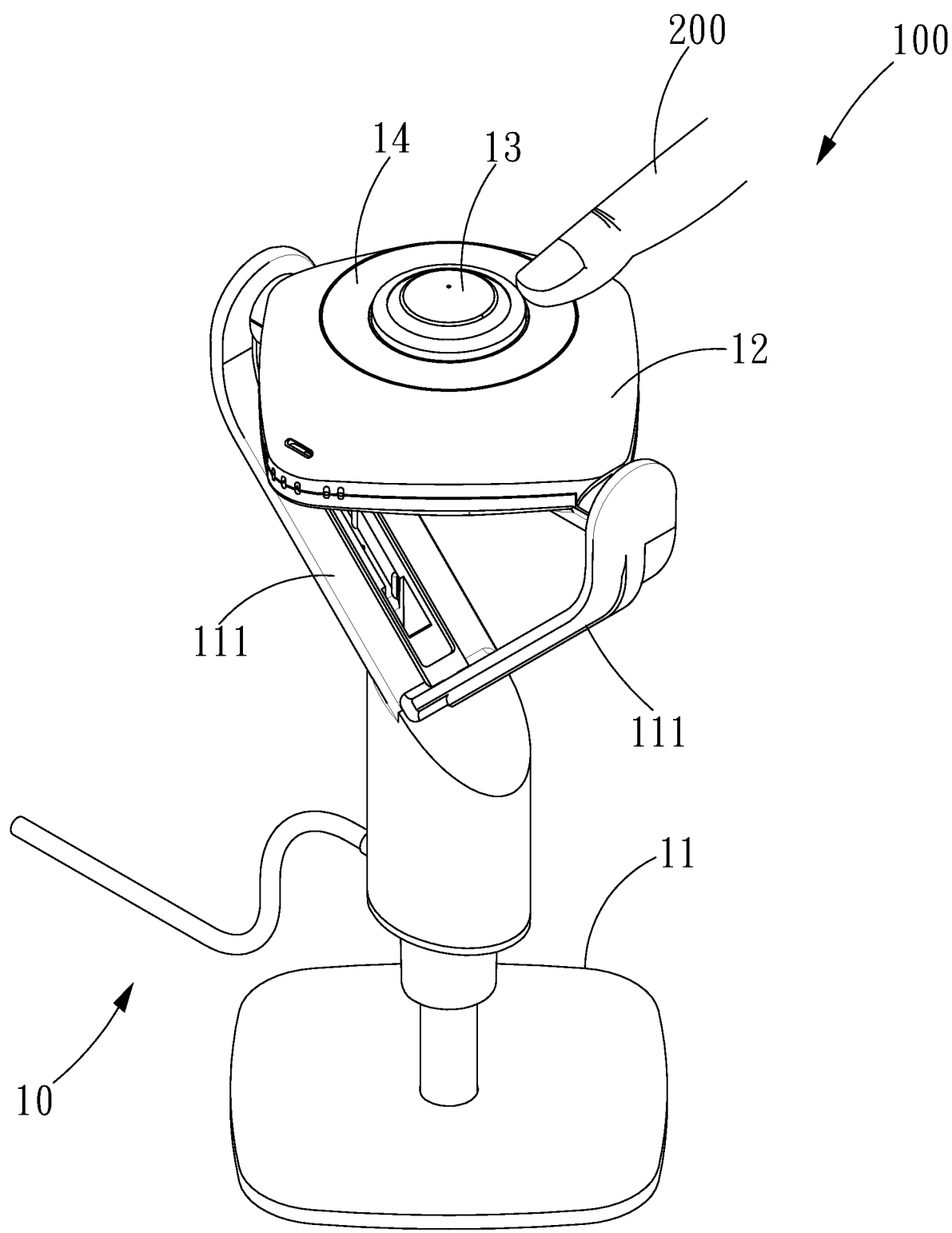
FIG. 1 is a perspective view showing a 360-degree panorama image selective displaying camera according to a first embodiment of the present invention.
Figure 2:
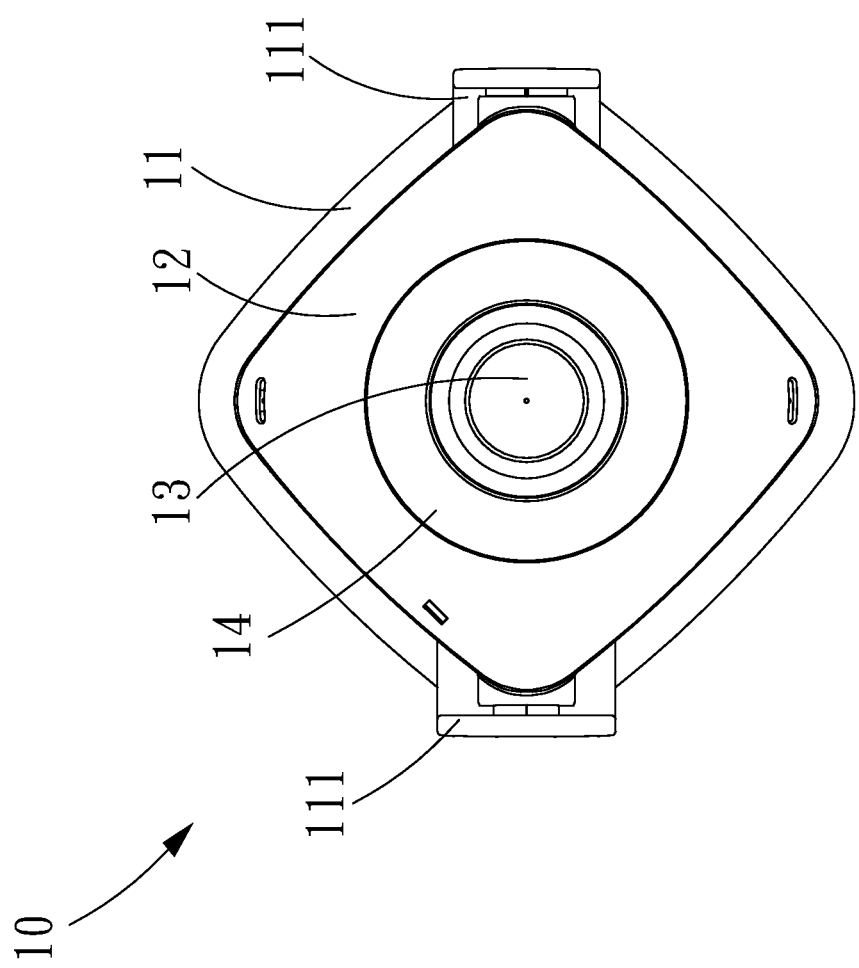
FIG. 2 is a top plan view of FIG. 1.
Figure 3:
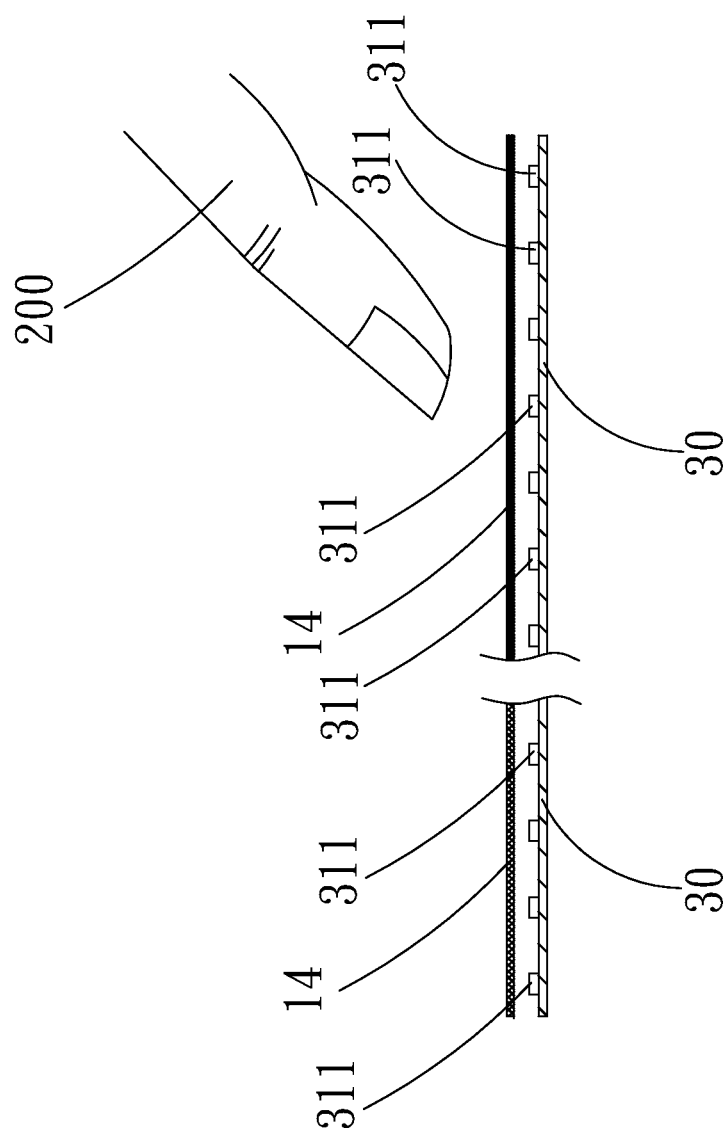
FIG. 3 is a partial cross-sectional view, in an enlarged view, showing a corresponding relationship between a triggering section of a 360-degree panoramic image camera body of the 360-degree panorama image selective displaying camera according to the present invention and image direction sensing elements of a displaying-position triggering sensing mechanism.

Referring to FIGS. 1, 2, and 3, a 360-degree panorama image selective displaying camera 100 according to a first embodiment of the present invention is shown, in which the camera 100 comprises at least one 360-degree panoramic image camera body 10, which is not limited to any specific form and outside appearance and is exemplified, in the present invention, as comprising a combination of at least one base 11 and a photographing section 12. The base 11 has an upper end that is provided, at each of two sides thereof, with at least one connection arm 111. The photographing section 12 has two ends that rotatably connected to and located between the connection arms 111 of the two sides of the upper end of the base 11, allowing the photographing section 12 to rotate to face upward in order to exhibit an operation state in the form of a horizontal plane (as shown in FIG. 1). At least one wide-angle lens module 13 and a triggering section 14 are arranged on an outer circumferential portion of the photographing section 12. The wide-angle lens module 13 is for photographing to acquire a 360-degree panorama image or picture. The wide-angle lens module 13 is not limited to any specific form, and is exemplified, in the present invention, as a fisheye lens module or a multi-lens module. The triggering section 14 is not limited to any specific shape and mounting position, and is exemplified, in the present invention, as an arrangement that the triggering section 14 is of an annular form and surrounds an outer periphery of the wide-angle lens module 13. Further, the triggering section 14 is not limited to any specific form, and is exemplified, in the present invention, as comprising non-conductive rubber or conductive rubber that resiliently returns as being compressed. The triggering section 14 is arranged to cover and correspond to an arrange of photographing angle of the wide-angle lens module 13 and is operable by a user finger 200 through pressing touch, or touching and/or pressing, (as shown in FIGS. 1 and 3).

Figure 4:
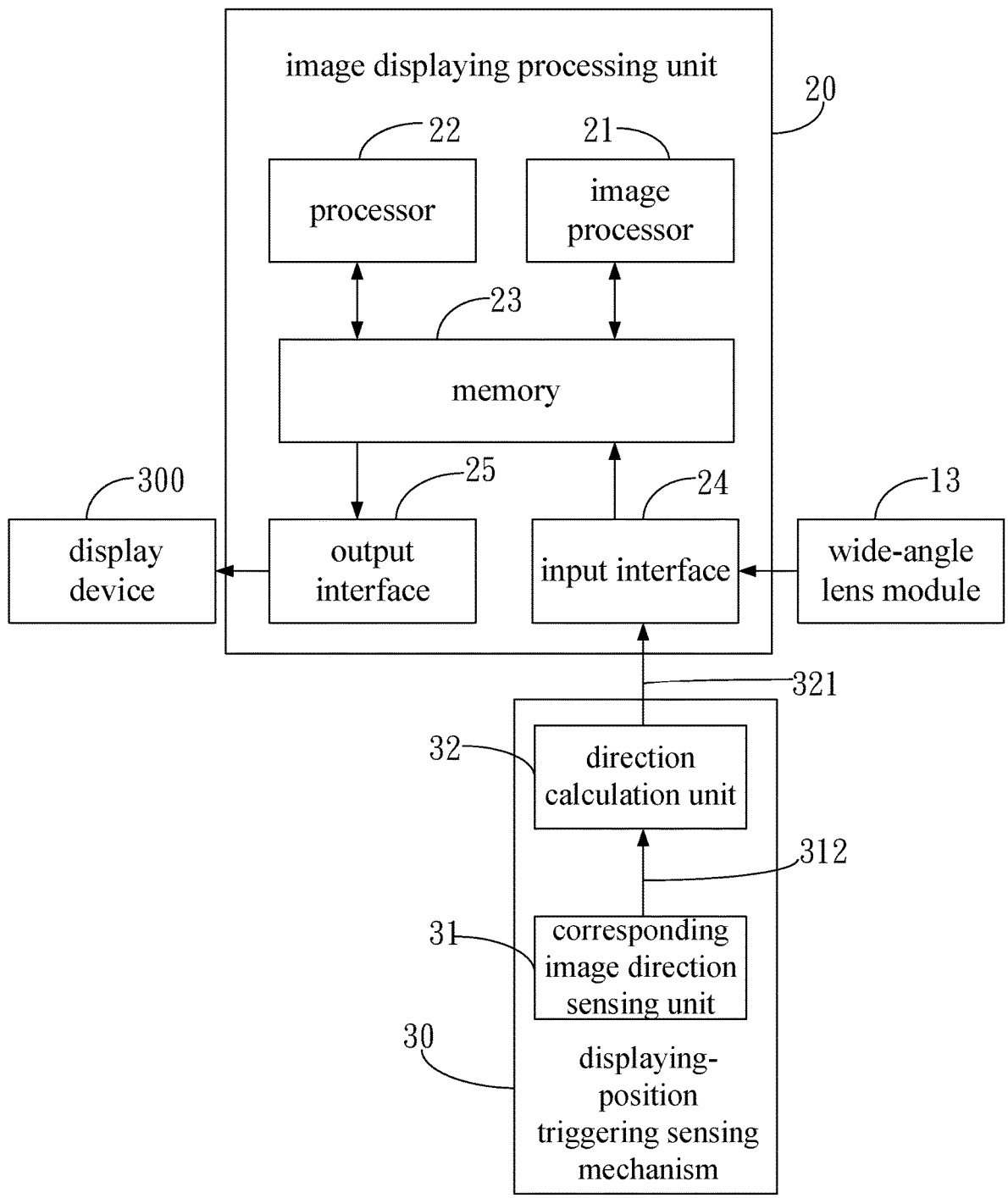
FIG. 4 is a block circuit diagram of an image displaying processing unit and a displaying-position triggering sensing mechanism of the 360-degree panorama image selective displaying camera according to the first embodiment of the present invention.

Referring additionally to FIG. 4, at least one image displaying processing unit 20 is arranged in an interior of the photographing section 12 of the 360-degree panoramic image camera body 10 and is connected to the wide-angle lens module 13 of the 360-degree panoramic image camera body 10 to process and/or output the 360-degree panorama image or picture photographed and captured by the wide-angle lens module 13. The image displaying processing unit 20 is not limited to any specific form, and is exemplified, in the present invention, as comprising a combination of at least one image processor 21, a processor 22, a memory 23, an input interface 24, and an output interface 25, wherein the image processor 21 functions to process the 360-degree panorama image or picture. The image processor 21 is not limited to any specific form, and is exemplified, in the present invention, as a graphics processing unit or an image processing integrated circuit having functions of special graphics, image processing engine, image dewarping, and stitching. The processor 22 is operable to assist the image processor 21 for output or input control and processing of data of the 360-degree panorama image. The memory 23 is connected to the image processor 21 and the processor 22 to provide temporary data storage and buffering of image data output and input for the image processor 21 and the processor 22. The input interface 24 is connected to the memory 23 and the wide-angle lens module 13 of the 360-degree panoramic image camera body 10 for input or receiving the 360-degree panorama image photographed and acquired by the wide-angle lens module 13. Further, the input interface 24 is not limited to any specific form, and is exemplified, in the present invention, as a USB interface, a MIPI interface, a I²C interface, a I²S interface, or a UART interface. The output interface 25 is connected to the memory 23 and at least one display device 300. The output interface 25 is not limited to any specific form, and is exemplified, in the present invention, as a USB interface or a I²S interface, such that byway of the output interface 25, a 360-degree panorama image outputted from the image processing unit 21 is supplied to and displayed on the display device 30. The display device 300 is not limited to any specific form, and is exemplified, in the present invention, as computer equipment having a displaying device, a notebook computer, a tablet computer, projection equipment, an LCD displaying device, or a smart mobile device.

Figure 8:
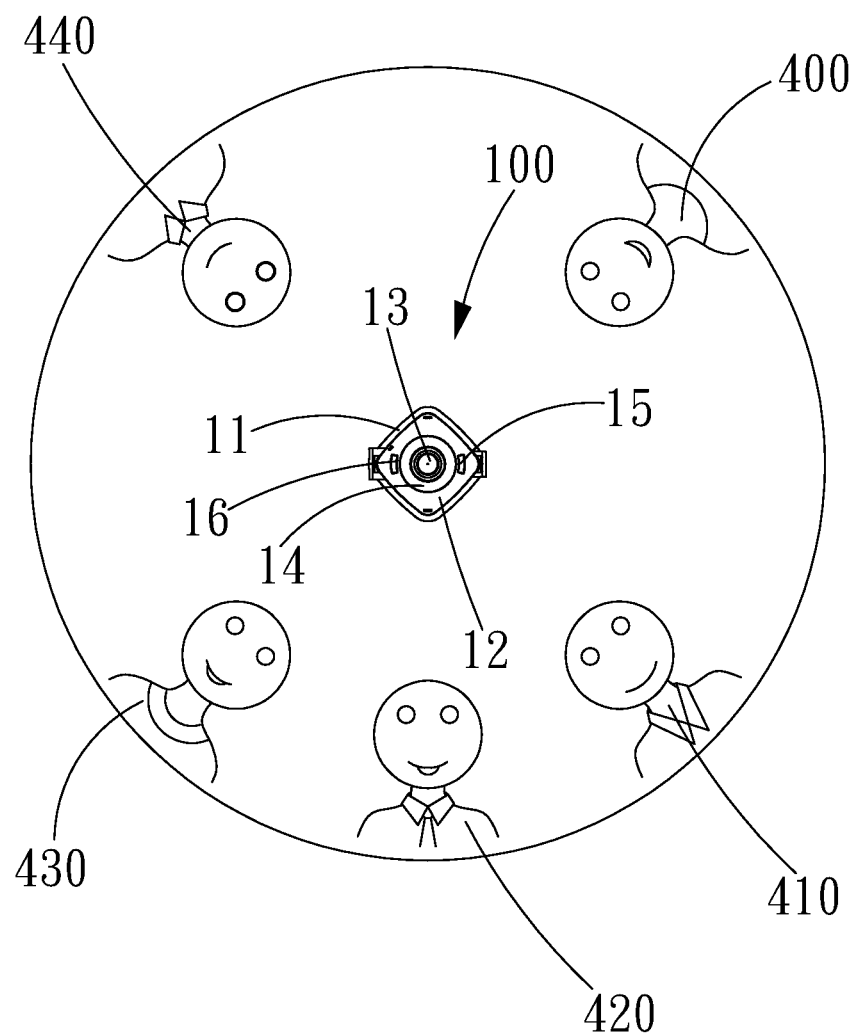
FIG. 8 is a schematic view illustrating a preferred example of application of the 360-degree panorama image selective displaying camera according to the present invention.
Figure 11:
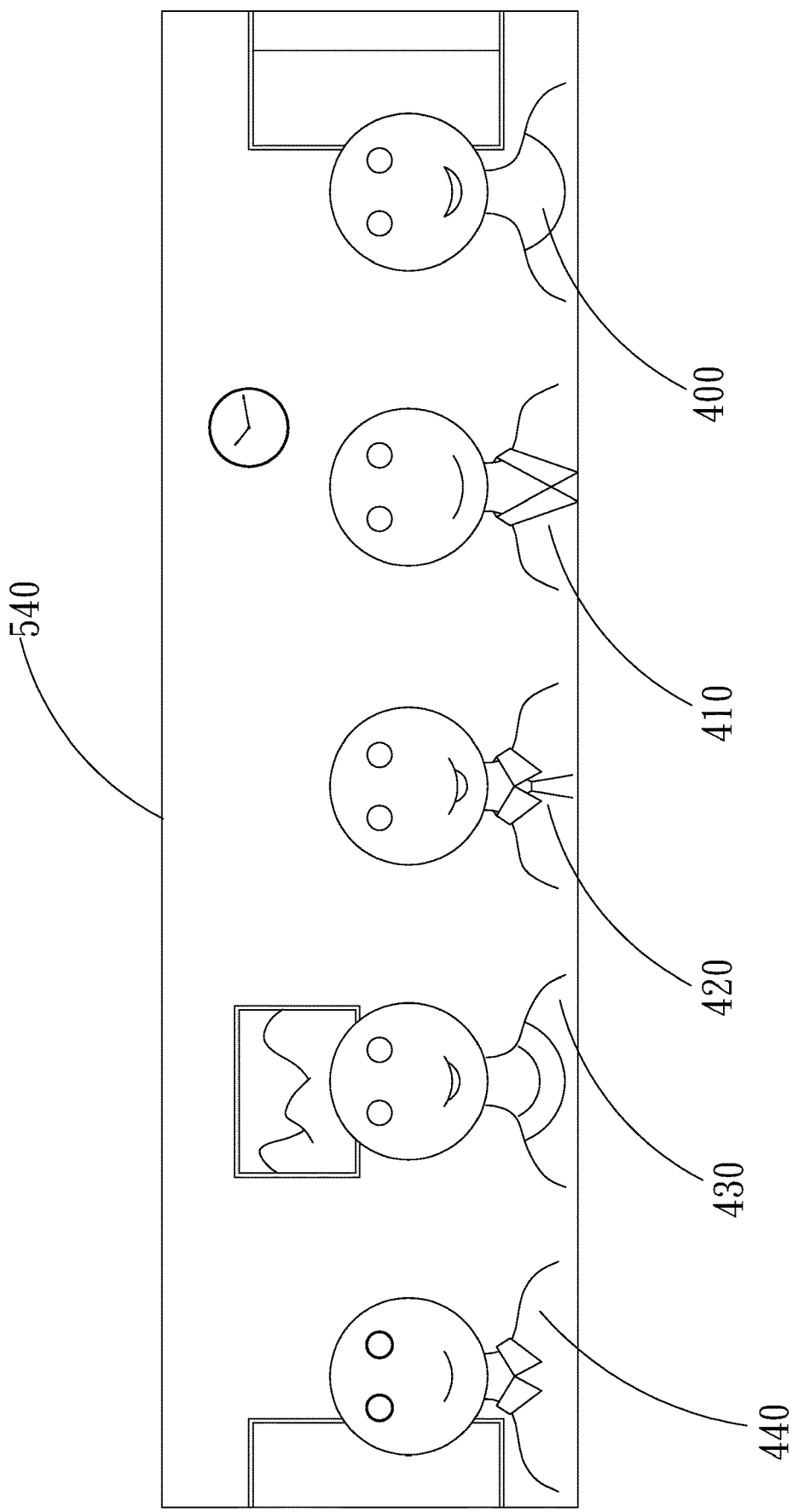
FIG. 11 is a schematic view illustrating an image displayed on a display device of the 360-degree panorama image selective displaying camera according to a preferred embodiment of the present invention.

At least one displaying-position triggering sensing mechanism 30 is arranged inside the photographing section 13 of the 360-degree panoramic image camera body 10 and is connected to the image displaying processing unit 20. Further, the displaying-position triggering sensing mechanism 30 is arranged to correspond to the triggering section 14 of the 360-degree panoramic image camera body 10, so that a pressing touch operation that occurs outside and is applied to the triggering section 14 causes the displaying-position triggering sensing mechanism 30 to detect the position and direction of the pressing touch applied to the triggering section 14 and generates a triggering-position selection sensing signal 321 to the image displaying processing unit 20. The displaying-position triggering sensing mechanism 30 is not limited to any specific form, and is exemplified, in the present invention, as comprising at least one corresponding image direction sensing unit 31 and a direction calculation unit 32, wherein the corresponding image direction sensing unit 31 is formed of a plurality of image direction sensing elements 311 (as shown in FIG. 3). The image direction sensing elements 311 are not limited to any specific form, and are exemplified, in the present invention, as being each a switch element or a capacitance sensing element. Each of the image direction sensing elements 311 is located under and corresponds to an underside of the triggering section 14 of the 360-degree panoramic image camera body 10, so that pressing touch applied to the triggering section 14 triggers at least one of the image direction sensing elements 311 to detect the touch and generate and output a primary direction sensing signal 312 (as shown in FIG. 4). The direction calculation unit 32 is connected to the corresponding image direction sensing unit and the input interface 24 of the image displaying processing unit 20, so that the direction calculation unit 32 may carry out calculation, based on the primary direction sensing signal 312 outputted from the corresponding image direction sensing unit 311, to identify or determine a corresponding direction of a site of pressing touch applied to the triggering section 14 and generates a triggering-position selection sensing signal 321 that is then applied to the input interface 24 of the image displaying processing unit 20, so that the image processor 21 of the image processing unit 20 may selectively retrieve, enlarge, cut, and stitch one of photographed subjects 400, 410, 420, 430, 440 that corresponds to the pressing touch position and direction of the triggering section 14, according to the triggering-position selection sensing signal 321 (as shown in FIGS. 8, 11, and 12), which serves as a retrieved image 500, 510, 520 (as shown in FIG. 12), to combine with the original or primitive 360-degree panorama image 540 (as shown in FIG. 11) photographed and acquired by the wide-angle lens module 13 of the 360-degree panoramic image camera body 10 as a combined output.

Figure 5:
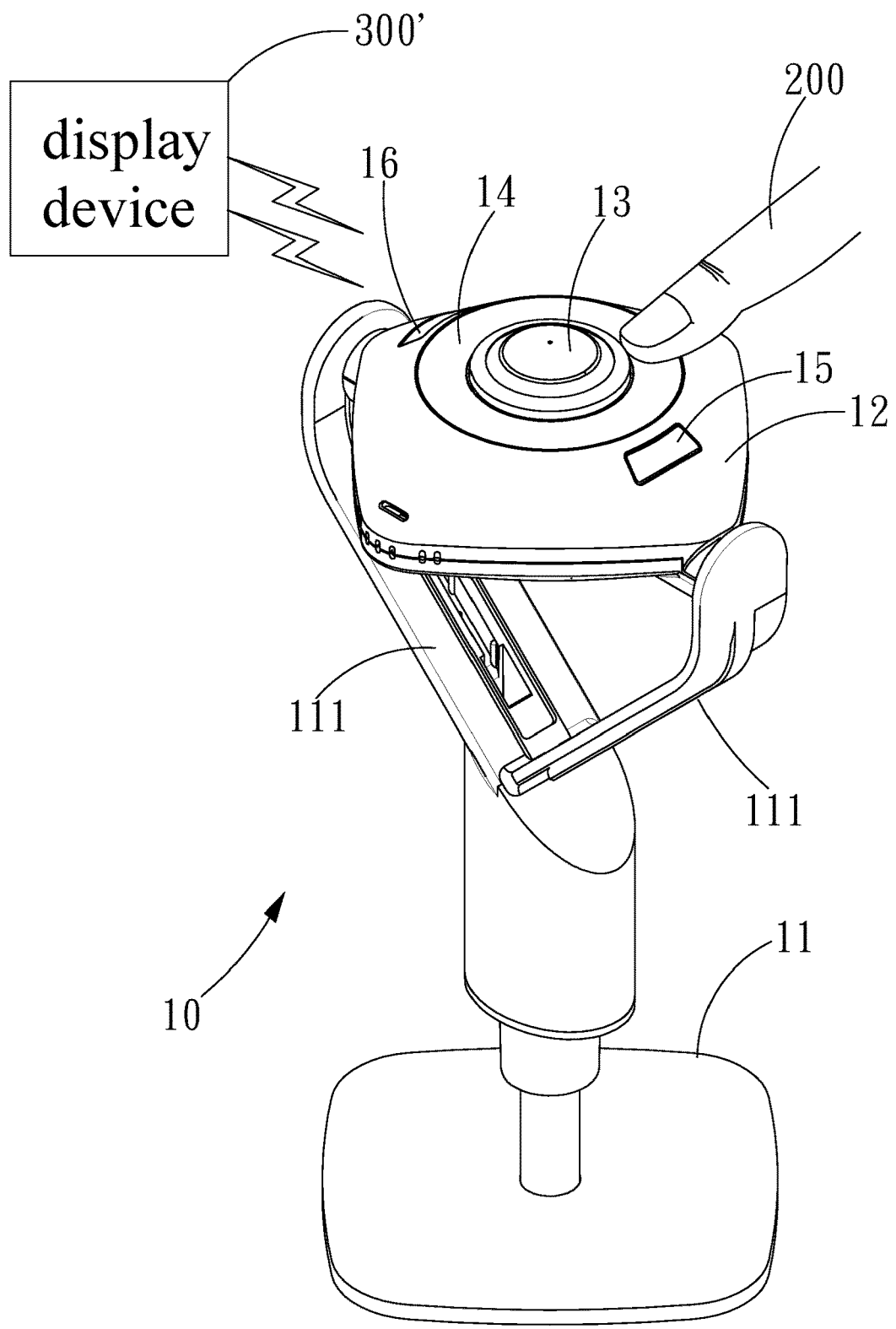
FIG. 5 is a perspective view showing a 360-degree panorama image selective displaying camera according to a second embodiment of the present invention.
Figure 6:
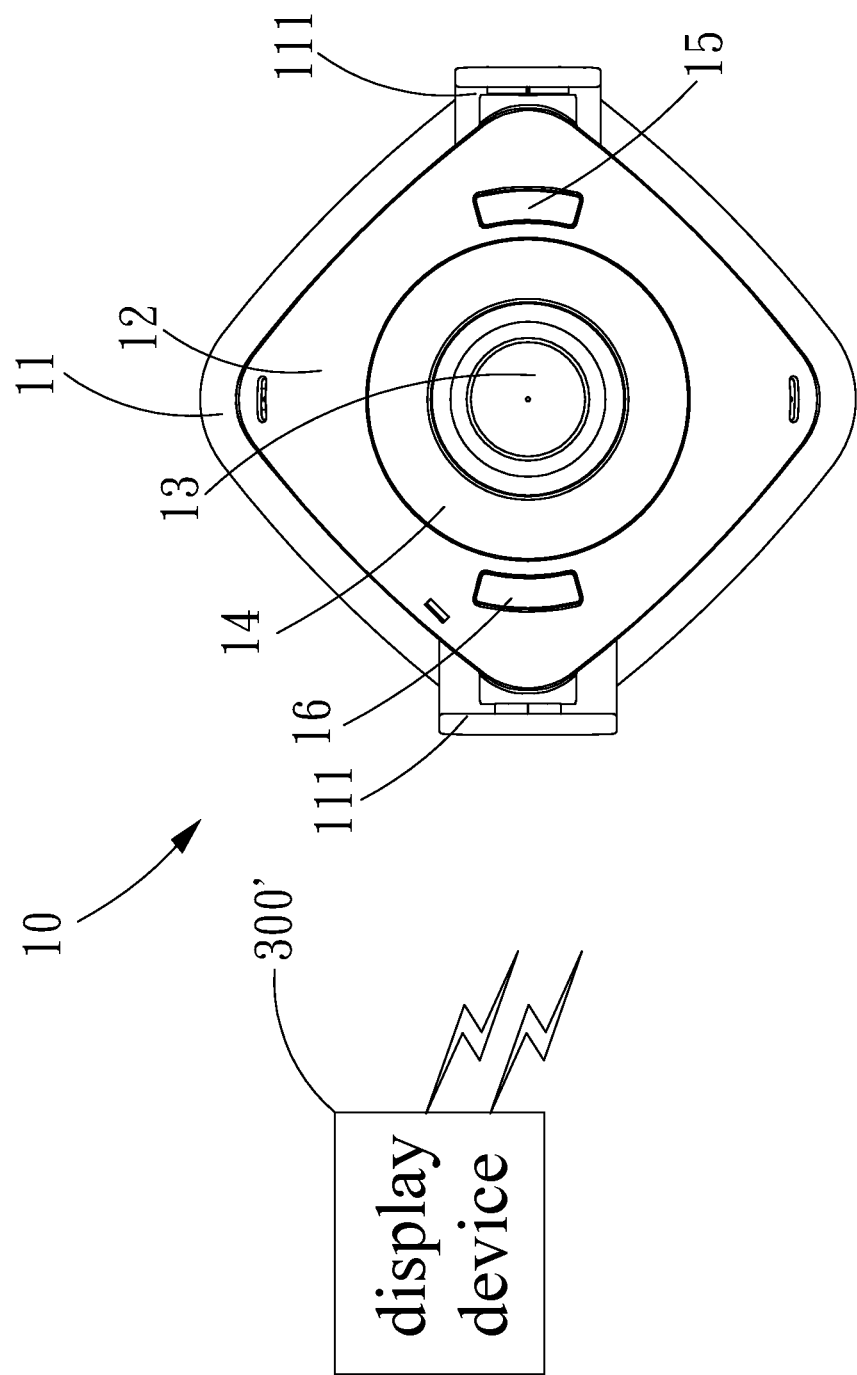
FIG. 6 is a top plan view of FIG. 5.
Figure 7:
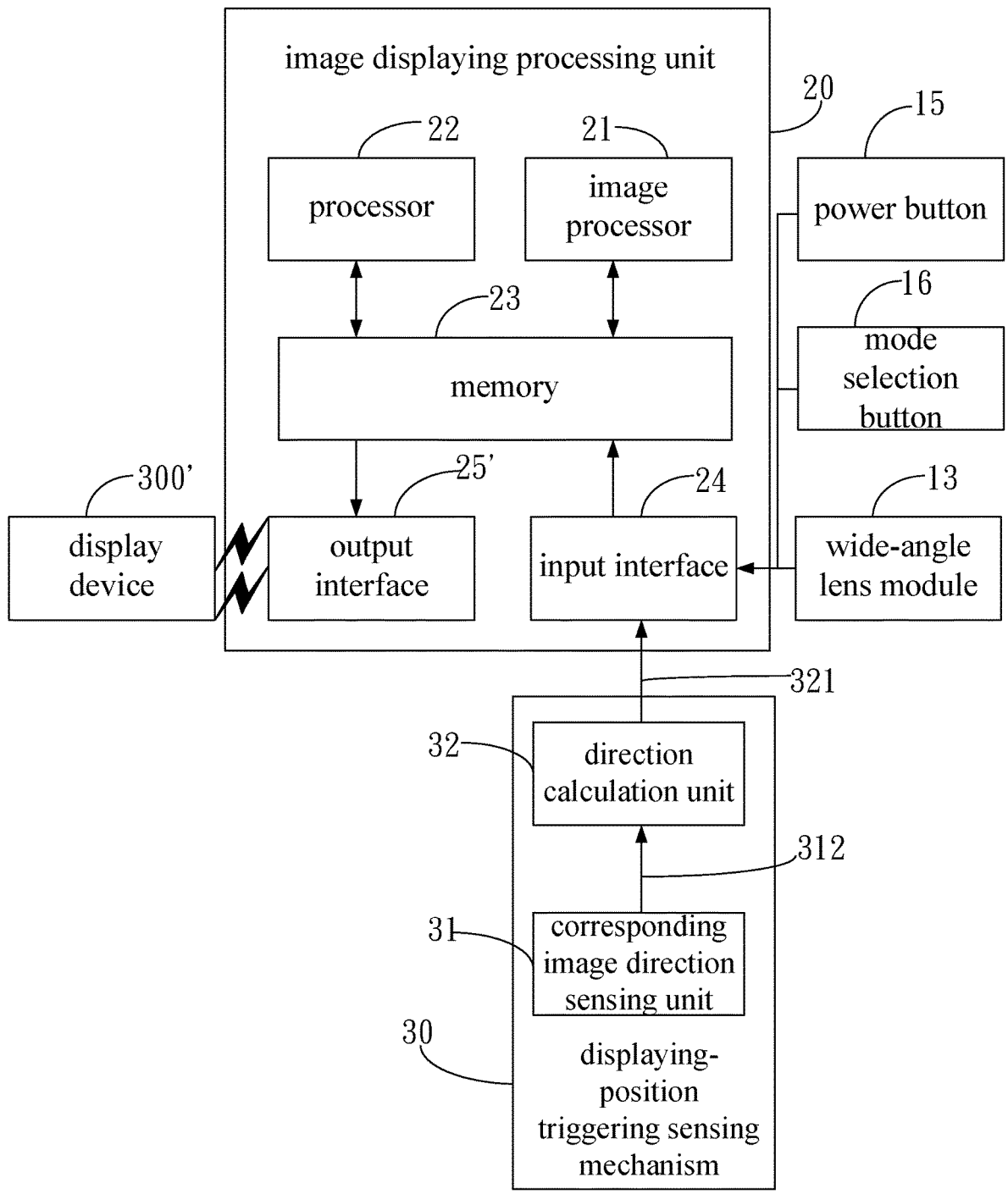
FIG. 7 is a block circuit diagram of an image displaying processing unit and a displaying-position triggering sensing mechanism of the 360-degree panorama image selective displaying camera according to the second embodiment of the present invention.

Further referring to FIGS. 5, 6, and 7, a 360-degree panorama image selective displaying camera 100 according to a second embodiment of the present invention is shown, wherein at least one power button 15 and a mode selection button 16 are shown, arranged outside the photographing section 12 of the 360-degree panoramic image camera body 10. The power button 15 and the mode selection button 16 are each connected to the input interface 24 of the image displaying processing unit 20 to be activatable, through for example pressing touch, to control power on/off and to cause the image displaying processing unit 20 to select a mode of outputting the primitive 360-degree panorama image 540 as a simple and straightforward output or a mode of combined output of the retrieved image 500, 510, 520 of the photographed subjects 400, 410, 420, 430, 440 that corresponds to the pressing touch position and direction of the triggering section 14 and is selectively retrieved, enlarged, cut, and stitched by the image displaying processing unit 20 according to the triggering-position selection sensing signal 321 generated by the displaying-position triggering sensing mechanism 3 corresponding to the pressing touch direction and position of the triggering section 14 to apply to the primitive 360-degree panorama image 540 photographed and acquired by the wide-angle lens module 13 of the 360-degree panoramic image camera body 10. For example, triggering, through pressing down, the mode selection button 16 once indicates a mode of simply outputting the primitive 360-degree panorama image 540, and successively pressing down the mode selection button 16 twice indicates selecting a combined output mode of the selectively retrieved image 500, 510, 520 in combination with the primitive 360-degree panorama image 540.

Further, in the second embodiment of the 360-degree panorama image selective displaying camera 100 according to the present invention, the output interface 25' of the image displaying processing unit 20 comprises a wireless USB interface, which outputs, in a wireless manner, the primitive 360-degree panorama image 540 or the selectively retrieved image 500, 510, 520 in combination with the primitive 360-degree panorama image 540 to at least one wireless display device 300' to display thereon. The wireless display device 300' is not limited to any specific form, and is exemplified, in the present invention, as computer equipment, a notebook computer, a tablet computer, wireless projection equipment, an LCD displaying device, or a smart mobile device that is capable of wirelessly receiving and displaying an image.

Figure 9:
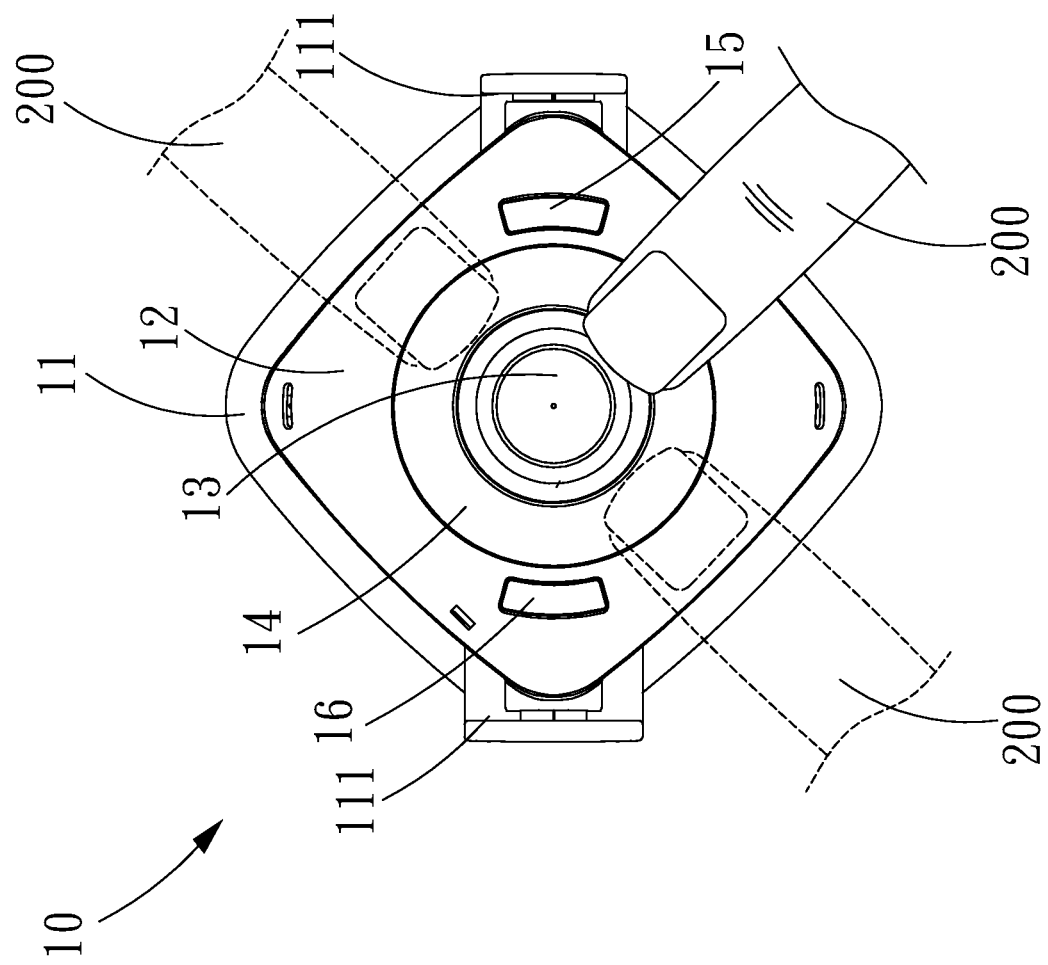
FIG. 9 is a top plan view, illustrating a state concerning direction and position of a triggering section of the 360-degree panorama image selective displaying camera that is touched and pressed down by a user's finger.
Figure 10:
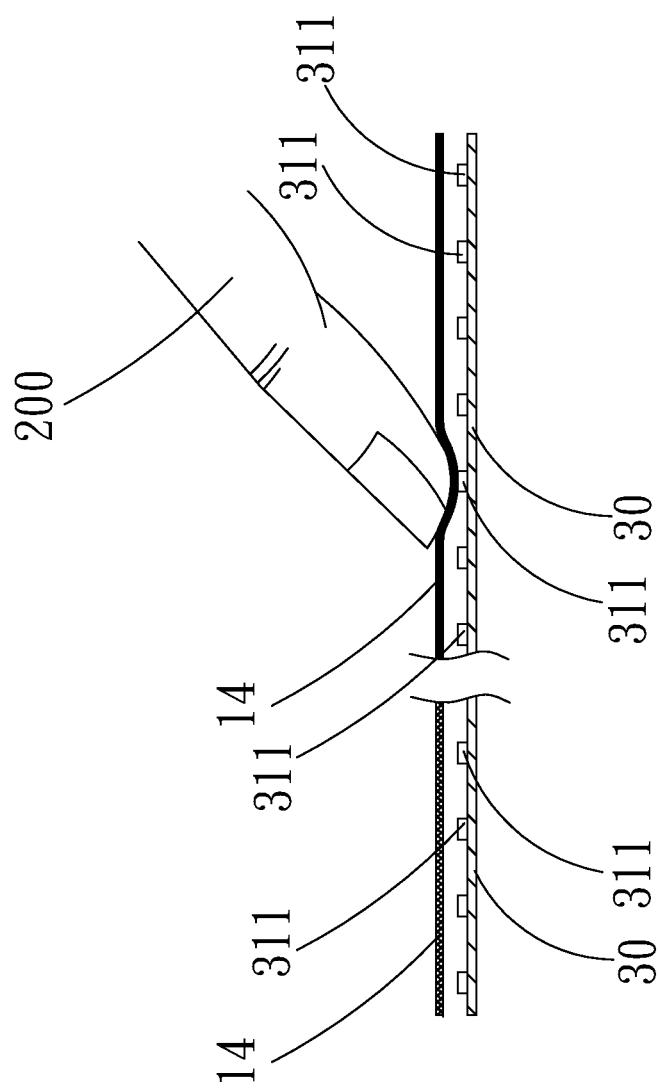
FIG. 10 is a partial cross-sectional view, illustrating a state concerning an operation that the triggering section of the 360-degree panorama image selective displaying camera according to the present invention triggers image direction sensing elements of the positioning triggering sensing mechanism.
Figure 12:
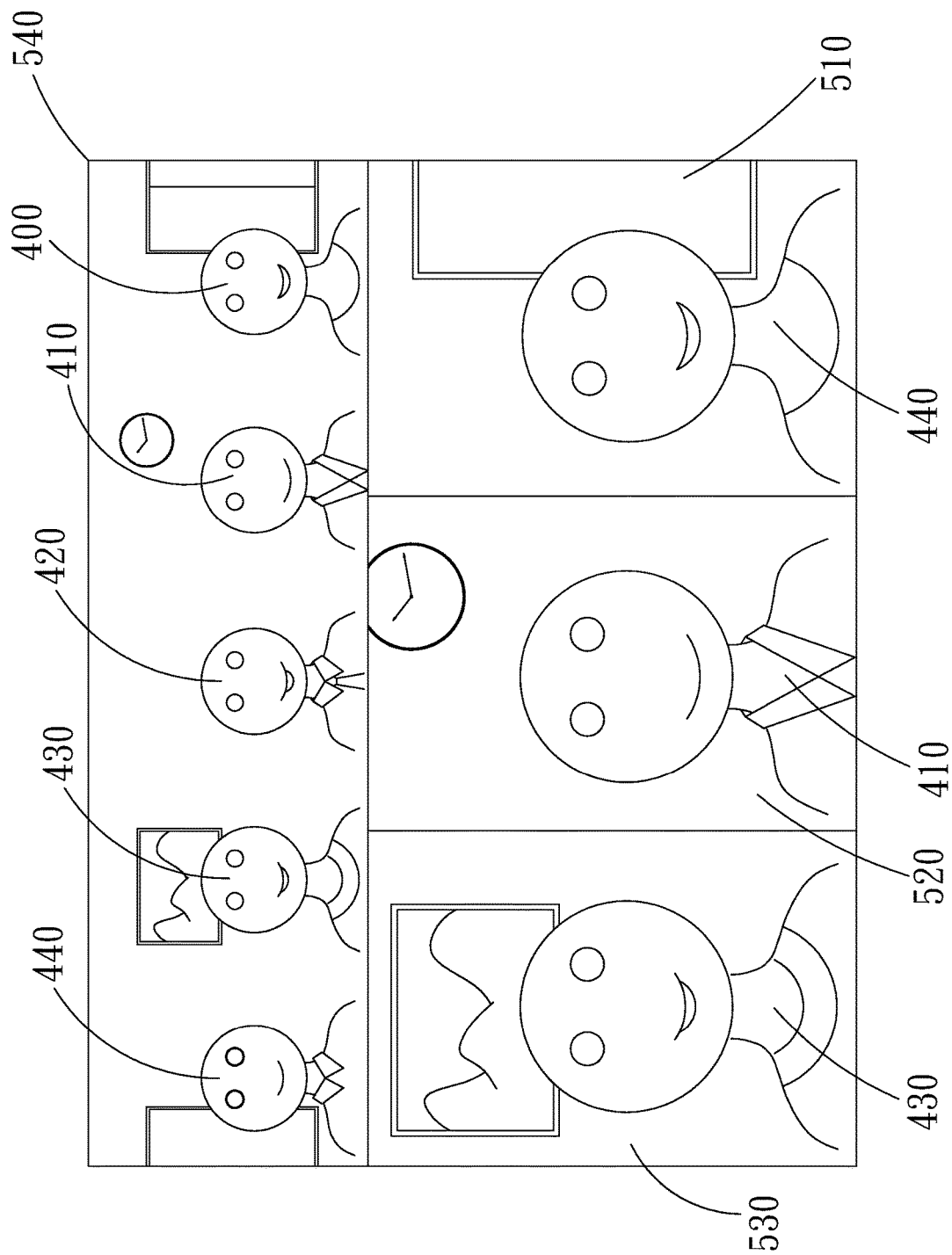
FIG. 12 is another schematic view illustrating an image displayed on a display device of the 360-degree panorama image selective displaying camera according to a preferred embodiment of the present invention.

Referring additionally to FIGS. 8, 8, 10, 11, and 12, a preferred example of application of the 360-degree panorama image selective displaying camera 100 according to the present invention is shown, wherein mode selection is made through a pressing touch operation applied to the mode selection button 16 of the photographing section 12 of the 360-degree panoramic image camera body 10, and selection is made on the mode of outputting the primitive 360-degree panorama image 540 combined with the selectively retrieved images 500, 510, 520 of the photographed subjects 400, 410, 420, 430 or 440 that is selected. The triggering section 14 of the photographing section 12 of the 360-degree panoramic image camera body 10 is operated as being pressed and touched by a user's finger 200 to select at least one of the photographed subjects 400, 410, 420, 430, 440. In the present invention, it is demonstrated that the triggering section 14 is selectively touched and pressed down at directions and positions respectively corresponding to the photographed subjects 400, 410, 430 (as shown in FIG. 9). The triggering section 14, upon being touched and pressed down, triggers at least one of the image direction sensing elements 311 of the corresponding image direction sensing unit 31 of the displaying-position triggering sensing mechanism 30, making the image direction sensing element 311 output a primary direction sensing signal 31A to the direction calculation unit 32, and then, the direction calculation unit 32, based on the primary direction sensing signal 312 outputted from the corresponding image direction sensing unit 311, calculates a corresponding direction corresponding to the pressing touch position of the triggering section 14 and generates a triggering-position selection sensing signal 321 outputted to the image displaying processing unit 20, so that the image displaying processing unit 20 is put into operation according to a result of image retrieve selection made on the photographed subjects 400, 410, 430 represented by the triggering-position selection sensing signal 321, such that the image displaying processing unit 20 processes the photographed subjects 400, 410, 430 to selectively retrieve, enlarge, and cut the images thereof to form the selectively retrieved images 500, 510, 520 as shown in FIG. 12, for being stitched to a lower part of the primitive 360-degree panorama image 540 shown in FIG. 11 as a combined output supplied to and displayed on the display device 300. The positions where the above-described selectively retrieved images 500, 510, 520 are stitched to the primitive 360-degree panorama image 540 are not limited to being stitched to the lower part of the primitive 360-degree panorama image 540, other positions where stitching is made to an upper part, a left-side part, or a right-side part, of the primitive 360-degree panorama image 540 are considered within the scope of the present invention.

Further, as described above, when the mode selection pressing touch operation of the mode selection button 16 of the photographing section 12 of the 360-degree panoramic image camera body 10 is made to be that shown in FIG. 11 as a mode for directly outputting the primitive 360-degree panorama image 540, the image displaying processing unit 20 ignores the triggering-position selection sensing signal 321 outputted from the displaying-position triggering sensing mechanism 30, and the image displaying processing unit 20 directly outputs the primitive 360-degree panorama image 540 to the display device 300 for being directly displayed thereon. In other words, under this condition, even the user's finger 200 touches and presses down the triggering section 14 of the photographing section 12 of the 360-degree panoramic image camera body 10, no function and output operation that any image of the photographed subjects 400, 410, 420, 430, 440 is selectively retrieved, enlarged, cut, and stitched for combination with the primitive 360-degree panorama image 540.

Figure 13:
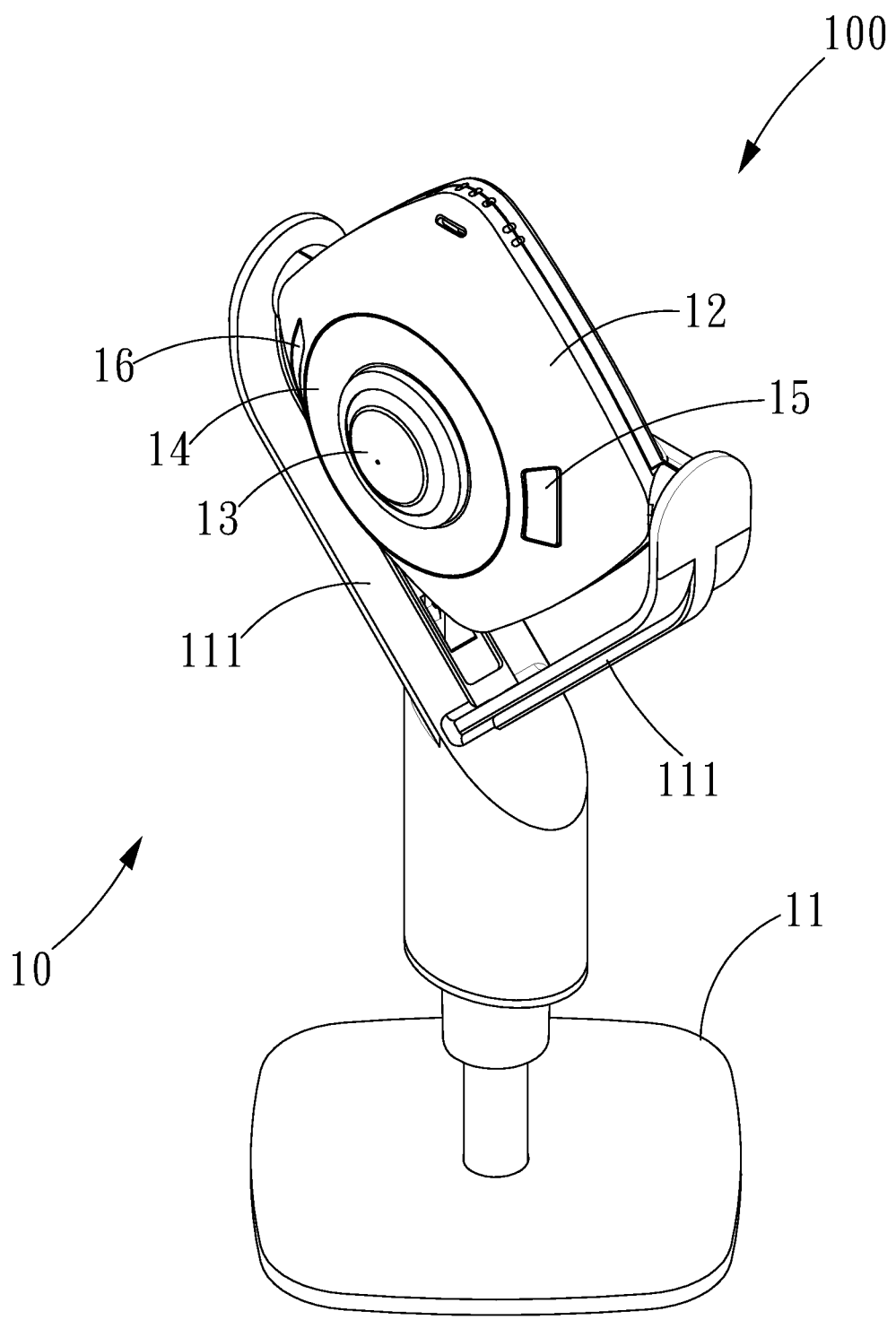
FIG. 13 is a perspective view, illustrating the 360-degree panorama image selective displaying camera according to the present invention set in a state that a photographing section is rotated to a stowed condition when not in use.

Further referring to FIG. 13, the above-described 360-degree panorama image selective displaying camera 100 according to the present invention shown in FIGS. 8 and 9, when not in use, can be operated through using the pivotal connection structure between the photographing section 12 of the 360-degree panoramic image camera body 10 and the connection arms 111 on the two sides of the upper end of the base 11, to have the photographing section 12 rotated downward for being stowed between the connection arms 111 on the two sides of the upper end of the base 11, thereby greatly reducing space required for stowage of the 360-degree panorama image selective displaying camera 100 of the present invention and thus, relatively reducing the amount that it might occupy of storage space the entirety of the 360-degree panorama image selective displaying camera 100.

The way of activation through pressing touch of the triggering section 14 of the 360-degree panoramic image camera body 10 of the 360-degree panorama image selective displaying camera 100 according to the present invention as described above with reference to FIGS. 1-13 is provided as an easy and straightforward example of operation according to the technical disclosure of this invention and is not limited to that operated with the user's finger 200 as discussed above, and any objects other than a user finger 200 that could activate, through touching and/or pressing, the triggering section 14, such as objects that are commonly used for touching and pressing, such as a pen and an indication rod, are considered within the scope of the present invention.

Further referring to FIG. 14, a flow chart illustrating a 360-degree panorama image selective displaying method according to the first embodiment of the present invention is shown, which comprises Steps 610-640 provided below:

(610) identifying if a primary direction sensing signal is triggered and generated, wherein detection is made as to if a triggering section 14 that is arranged outside a 360-degree panoramic image camera body 10 that is operable to photograph and acquire a 360-degree panorama image is subjected to a pressing touch operation applied by a user's finger 200, and wherein when the triggering section 14 is touched and pressed down by the user finger 200, a corresponding image direction sensing units 31 of a displaying-position triggering sensing mechanism 30 arranged inside the 360-degree panoramic image camera body 10 is triggered and generates and outputs at least one primary direction sensing signal 312, and if yes, executing Step (620), and if not, repeating Step (610);

(620) reading the primary direction sensing signal, wherein a direction calculation unit 32 of the displaying-position triggering sensing mechanism 30 arranged inside the 360-degree panoramic image camera body 10 of Step (610) reads the primary direction sensing signal 312 generated by the corresponding image direction sensing unit 31 as being detected through triggering in Step (610);

(630) calculating and acquiring a triggering-position selection sensing signal corresponding to a direction of pressing touch, wherein the direction calculation unit 32 of the displaying-position triggering sensing mechanism 30 of Step (620) calculates and acquires a triggering-position selection sensing signal 321 corresponding to pressing touch direction and position of the triggering section 14 outside the 360-degree panoramic image camera body 10 of Step (610); and (640) making an output of a combination, through cutting and stitching, of a primitive panoramic image and an image of a selected direction, wherein at least one image displaying processing unit 20 arranged inside the 360-degree panoramic image camera body 10 of Step (610) is operable, according to the triggering-position selection sensing signal 321 that is calculated and acquired by the direction calculation unit 32 of Step (630), to retrieve, enlarge, and cut an image of a photographed subject corresponding to a pressing touch position of the triggering section 14 of Step (610) in the panoramic photograph taken by the 360-degree panoramic image camera body 10, in order to form at least one selectively retrieved image, for being then stitched to and combined with the primitive 360-degree panorama image 540 photographed and acquired by the 360-degree panoramic image camera body of Step (610) for combined output, and repeating Step (610).

Further referring to FIG. 15, a flow chart illustrating a 360-degree panorama image selective displaying method according to the second embodiment of the present invention is shown, which comprises Steps 710-760 provided below:

(710) displaying mode input selection, wherein a pressing touch operation is applied to a mode selection button 16 arranged outside the 360-degree panoramic image camera body 10 that is operable to photograph and acquire a 360-degree panorama image to input and select a mode of output of a primitive 360-degree panorama image 540 or to output a selected direction subject image mode that an image of a selected photographed subject is stitched to the primitive 360-degree panorama image 540 for output;

(720) identifying if the selected direction subject image mode is selected for output, wherein at least one image displaying processing unit 20 arranged inside the 360-degree panoramic image camera body 10 of Step (710) detects and determines if the mode selection button 16 of Step (710) is touched and pressed down to select output of the primitive 360-degree panoramic image mode 540 or to select output of the selected direction subject image mode in which the selected photographed subject image is stitched to the primitive 360-degree panorama image 540 for output, if yes, executing Step (730), and if not, executing Step (721);

(721) outputting the primitive 360-degree panorama image, wherein direct outputting is made for the primitive 360-degree panorama image 540 photographed and acquired by the 360-degree panoramic image camera body 10 of Step (710) to be directly outputted by the image displaying processing unit of Step (720), and repeating Step (710);

(730) identifying if a primary direction sensing signal is triggered and generated, wherein detection is made as to if the triggering section 14 outside the 360-degree panoramic image camera body 10 of Step (710) is subjected to a pressing touch operation applied by a user's finger 200, and wherein when the triggering section 14 is touched and pressed down by the user's finger, a corresponding image direction sensing units 31 of a displaying-position triggering sensing mechanism 30 arranged inside the 360-degree panoramic image camera body 10 is triggered and generates and outputs at least one primary direction sensing signal 312, and if yes, executing Step (740), and if not, repeating Step (730);

(740) reading the primary direction sensing signal, wherein a direction calculation unit 32 of the displaying-position triggering sensing mechanism 30 arranged inside the 360-degree panoramic image camera body 10 of Step (730) reads the primary direction sensing signal 312 generated by the corresponding image direction sensing unit 31 as being detected through triggering in Step (730);

(750) calculating and acquiring a triggering-position selection sensing signal corresponding to a direction of pressing touch, wherein the direction calculation unit 32 of the displaying-position triggering sensing mechanism 30 of Step (740) calculates and acquires a triggering-position selection sensing signal 321 corresponding to pressing touch direction and position of the triggering section 14 outside the 360-degree panoramic image camera body 10 of Step (730); and (760) making an output of a combination, through cutting and stitching, of a primitive panoramic image and an image of a selected direction, wherein the image displaying processing unit 20 arranged inside the 360-degree panoramic image camera body 10 of Step (730) is operable, according to the triggering-position selection sensing signal 321 that is calculated and acquired by the direction calculation unit 32 of Step (750), to retrieve, enlarge, and cut an image of a photographed subject 400, 410, 420, 430 or 440 corresponding to a pressing touch position of the triggering section 14 of Step (730) in the panoramic photograph taken by the 360-degree panoramic image camera body 10, in order to form at least one selectively retrieved image 500, 510, 520, for being then stitched to and combined with the primitive 360-degree panorama image 540 photographed and acquired by the 360-degree panoramic image camera body of Step (730) for combined output, and repeating Step (710).

Figure 14:
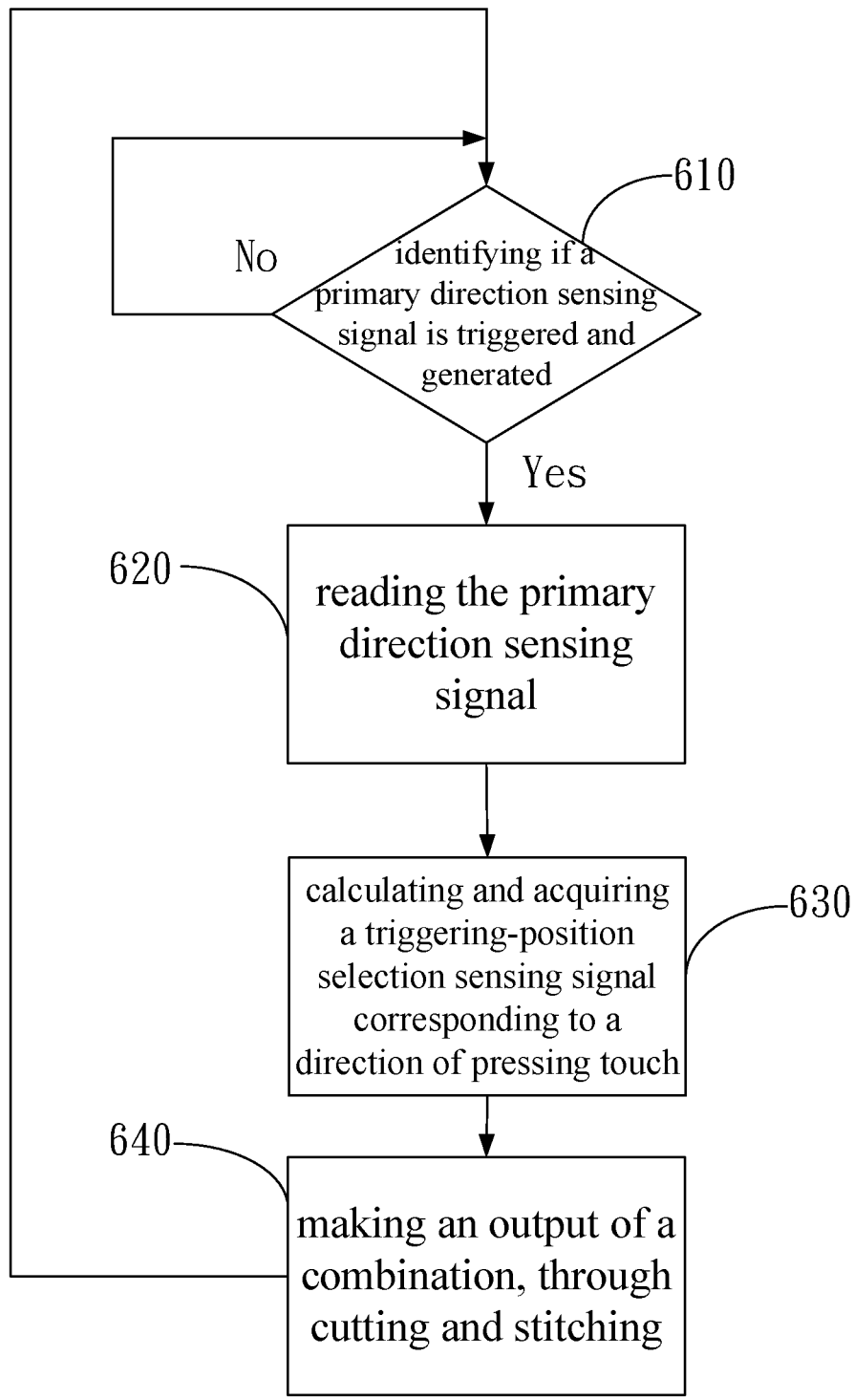
FIG. 14 is a flow chart illustrating a 360-degree panorama image selective displaying method according to a first embodiment of the present invention.
Figure 15:
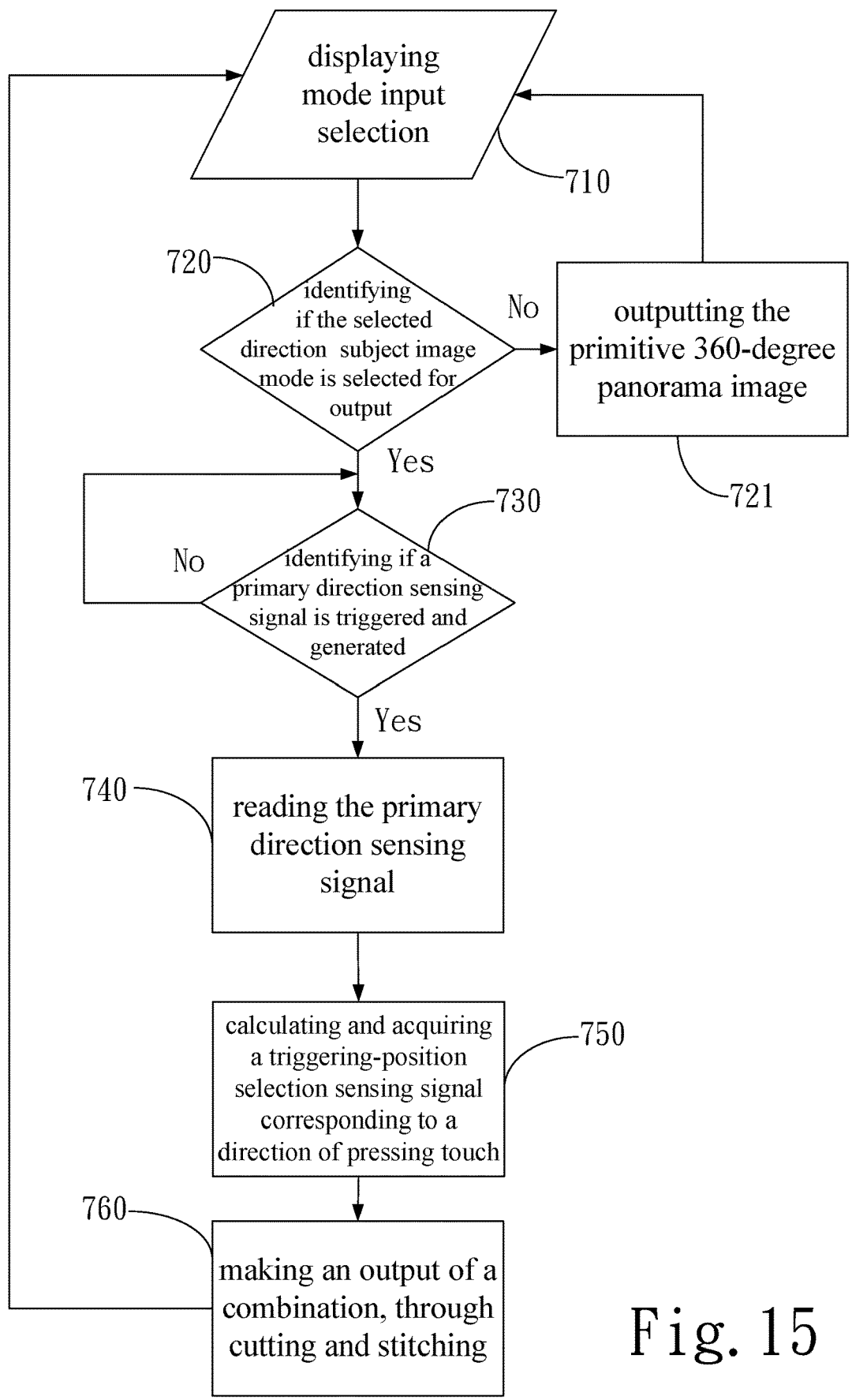
FIG. 15 is a flow chart illustrating a 360-degree panorama image selective displaying method according to a second embodiment of the present invention.

Steps 610-640 and steps 710-760 of the flow charts of the 360-degree panorama image selective displaying method according to the first and second embodiments of the present invention as shown in FIGS. 14 and 15 can be implemented in a control software mode or an application program that are previously burnt in and loaded in the image processor 21 and the processor 22 of the image displaying processing unit 20.

In the 360-degree panorama image selective displaying camera and method according to the present invention as shown in FIGS. 1-15, the disclosure of the related description and drawings is provided for illustratively explaining the technical contents and technical measures adopted in this invention and is provided for illustrating just example embodiments and is not intended to limit the scope of the present invention. It is appreciated that minor modification of the structure, the element, and the method according to the present invention, as well as equivalent replacement thereof, is considered within the spirit and scope of the present invention that are only determined according to the appended claims.

What is claimed is:

1. A 360-degree panorama image selective displaying camera, comprising:

a 360-degree panoramic image camera body, which is provided, on an outside thereof, with at least one wide-angle lens module and a triggering section configured in an annular contour and disposed in a surrounding relationship with an outer circumference of the wide-angle lens module, the wide-angle lens module being operable to photograph and acquire a 360-degree panorama image, the triggering section being arranged to cover and correspond to a range of photographing angle of the wide-angle lens module and being operable through pressing touch by a user;

at least one image displaying processing unit, which is arranged inside the 360-degree panoramic image camera body and is connected to the wide-angle lens module of the 360-degree panoramic image camera body to process an output of the 360-degree panorama image photographed and captured by the wide-angle lens module;

at least one displaying-position triggering sensing mechanism including a plurality of image direction sensing elements located in correspondence to an underside of the annularly contoured triggering section in a surrounding relationship with an outer circumference of the wide-angle lens module, the at least one displaying-position triggering sensing mechanism being arranged inside the 360-degree panoramic image camera body and is being connected to the image displaying processing unit, the displaying-position triggering sensing mechanism being arranged to correspond to the triggering section of the 360-degree panoramic image camera body, so that a pressing touch operation applied to the triggering section causes at least one of the plurality of the image direction sensing elements of the displaying-position triggering sensing mechanism to detect pressing touch position and direction of the triggering section and generates a triggering-position selection sensing signal to the image displaying processing unit, to allow the image processing unit to correspondingly and selectively retrieve, enlarge, cut, and stitch a selectively retrieved image of the photographed subject that corresponds to the pressing touch position and direction of the triggering section to the primitive 360-degree panorama image photographed and acquired by the 360-degree panoramic image camera body as a combined output, and at least one mode selection indicia disposed in proximity to the triggering section, the at least one mode selection indicia being actuatable once to display the primitive 360-degree panorama image, and being actuatable twice to select a combined output mode for displaying the selectively retrieved image in combination with the primitive 360-degree panorama image.

2. The 360-degree panorama image selective displaying camera according to claim 1, wherein the 360-degree panoramic image camera body comprises:

at least one base, the base having an upper end having two sides that are each provide with at least one connection arm; and at least one photographing section, the photographing section having two ends that are rotatably connected between the connection arms of the two sides of the upper end of the base, the wide-angle lens module and the triggering section being each arranged on an outer peripheral portion of the photographing section, the image displaying processing unit and the displaying-position triggering sensing mechanism being each arranged inside the photographing section, wherein the photographing section is positioned at a horizontal angle through being rotated upwards so that the wide-angle lens module is operable for 360-degree wide-angle photographing, the triggering section being operable as being touched and pressed by a user's finger on a horizontal plane.

3. The 360-degree panorama image selective displaying camera according to claim 2, wherein the at least one mode selection indicia includes a mode selection button, and wherein the photographing section of the 360-degree panoramic image camera body is provided, on an outside thereof, with at least one power button and the mode selection button.

4. The 360-degree panorama image selective displaying camera according to claim 1, wherein the wide-angle lens module of the 360-degree panoramic image camera body comprises a fisheye lens module.

5. The 360-degree panorama image selective displaying camera according to claim 1, wherein the wide-angle lens module of the 360-degree panoramic image camera body comprises a multi-lens module.

6. The 360-degree panorama image selective displaying camera according to claim 1, wherein the triggering section of the 360-degree panoramic image camera body comprises conductive rubber.

7. The 360-degree panorama image selective displaying camera according to claim 1, wherein the triggering section of the 360-degree panoramic image camera body comprises non-conductive rubber.

8. The 360-degree panorama image selective displaying camera according to claim 1, wherein the image displaying processing unit is connected to at least one display device.

9. The 360-degree panorama image selective displaying camera according to claim 8, wherein the display device to which the image displaying processing unit is connected comprises computer equipment with a displaying unit.

10. The 360-degree panorama image selective displaying camera according to claim 8, wherein the display device to which the image displaying processing unit is connected comprises a notebook computer.

11. The 360-degree panorama image selective displaying camera according to claim 8, wherein the display device to which the image displaying processing unit is connected comprises a tablet computer.

12. The 360-degree panorama image selective displaying camera according to claim 8, wherein the display device to which the image displaying processing unit is connected comprises projection equipment.

13. The 360-degree panorama image selective displaying camera according to claim 8, wherein the display device to which the image displaying processing unit is connected comprises an LCD displaying device.

14. The 360-degree panorama image selective displaying camera according to claim 8, wherein the display device to which the image displaying processing unit is connected comprises a smart mobile device.

15. The 360-degree panorama image selective displaying camera according to claim 1, wherein the image displaying processing unit comprises:
at least one image processor, which functions to process the 360-degree panorama image;
at least one processor, which assists the image processor for output or input control and processing of data of the 360-degree panorama image;
at least one memory, which is connected to the image processor and the processor to provide temporary data storage and buffering of image data output and input to the image processor and the processor;
at least one input interface, which is connected to the memory, the wide-angle lens module of the 360-degree panoramic image camera body, and the displaying-position triggering sensing mechanism for input of the 360-degree panorama image photographed and acquired by the wide-angle lens module and the triggering-position selection sensing signal outputted from the displaying-position triggering sensing mechanism; and
at least one output interface, which is connected to the memory and at least one display device to output the primitive 360-degree panorama image or a 360-degree panorama image of a selectively retrieved image of the photographed subject corresponding to the pressing touch position and direction of the triggering section, which is processed and outputted by the image processor, to the display device for displaying.

16. The 360-degree panorama image selective displaying camera according to claim 15, wherein the image processor of the image displaying processing unit comprises a graphics processing unit (GPU).

17. The 360-degree panorama image selective displaying camera according to claim 15, wherein the image processor of the image displaying processing unit comprises an image processing integrated circuit having functions of special graphics, image processing engine, image dewarping, and stitching.

18. The 360-degree panorama image selective displaying camera according to claim 15, wherein the input interface of the image displaying processing unit comprises a USB interface.

19. The 360-degree panorama image selective displaying camera according to claim 15, wherein the input interface of the image displaying processing unit comprises an MIPI (Mobile Industry Processor Interface) interface.

20. The 360-degree panorama image selective displaying camera according to claim 15, wherein the input interface of the image displaying processing unit comprises an $I^2C$ (Inter-Integrated Circuit) interface.

21. The 360-degree panorama image selective displaying camera according to claim 15, wherein the input interface of the image displaying processing unit comprises an $I^2S$ (Inter-IC sound, I2S) interface.

22. The 360-degree panorama image selective displaying camera according to claim 15, wherein the input interface of the image displaying processing unit comprises an UART (Universal Asynchronous Receiver/Transmitter) interface.

23. The 360-degree panorama image selective displaying camera according to claim 15, wherein the output interface of the image displaying processing unit comprises a USB interface.

24. The 360-degree panorama image selective displaying camera according to claim 15, wherein the output interface of the image displaying processing unit comprises an I'S interface.

25. The 360-degree panorama image selective displaying camera according to claim 15, wherein the output interface of the image displaying processing unit comprises a wireless USB interface, which is connected, in a wireless manner, to at least one wireless display device.

26. The 360-degree panorama image selective displaying camera according to claim 1, wherein the displaying-position triggering sensing mechanism comprises:

at least one corresponding image direction sensing unit, which is formed of said plurality of image direction sensing elements, each of the image direction sensing elements being located under and corresponds to an underside of the triggering section of the 360-degree panoramic image camera body, so that the pressing touch applied to the triggering section triggers said at least one of the image direction sensing elements to detect and generate and output a primary direction sensing signal; and at least one direction calculation unit, which is connected to the corresponding image direction sensing unit and the image displaying processing unit, so as calculate a corresponding direction corresponding to the pressing touch position of triggering section according to the primary direction sensing signal outputted from the corresponding image direction sensing unit and generate a triggering-position selection sensing signal outputted to the image displaying processing unit.

27. The 360-degree panorama image selective displaying camera according to claim 26, wherein the image direction sensing elements of the corresponding image direction sensing unit each comprise a switch element.

28. The 360-degree panorama image selective displaying camera according to claim 26, wherein the image direction sensing elements of the corresponding image direction sensing unit each comprise a capacitance sensing element.

29. A 360-degree panorama image selective displaying method, comprising the following steps:
(A) disposing an annularly contoured triggering section in a surrounding relationship with an outer circumference of a wide-angle lens module, disposing at least one mode selection indicia in proximity to the triggering section, and positioning a plurality of image direction sensing units in correspondence with the annularly contoured triggering section, and identifying if a primary direction sensing signal is triggered and generated, wherein detection is made as to if the triggering section that is arranged outside a 360-degree panoramic image camera body that is operable to photograph and acquire a 360-degree panorama image is subjected to a pressing touch operation applied by a user, and wherein, when the triggering section is touched and pressed down by the user, at least one corresponding image direction sensing unit of said plurality of image direction sensing units of at least one displaying-position triggering sensing mechanism arranged inside the 360-degree panoramic image camera body is triggered to generate and output at least one primary direction sensing signal, and if yes, executing Step (B), and if not, repeating Step (A);
(B) reading the primary direction sensing signal, wherein at least one direction calculation unit of the displaying-position triggering sensing mechanism arranged inside the 360-degree panoramic image camera body of Step (A) reads the primary direction sensing signal generated by the corresponding image direction sensing unit as being detected through triggering in Step (A);
(C) calculating and acquiring a triggering-position selection sensing signal corresponding to a direction of pressing touch, wherein the direction calculation unit of the displaying-position triggering sensing mechanism of Step (B) calculates and acquires a triggering-position selection sensing signal corresponding to pressing touch direction and position of the triggering section outside the 360-degree panoramic image camera body of Step (A);

(D) making an output of a combination, through cutting and stitching, of a primitive panoramic image and an image of a selected direction, wherein at least one image displaying processing unit arranged inside the 360-degree panoramic image camera body of Step (A) is operable, according to the triggering-position selection sensing signal that is calculated and acquired by the direction calculation unit of Step (C), to retrieve, enlarge, and cut an image of a photographed subject corresponding to a pressing touch position of the triggering section of Step (A) in the panoramic photograph taken by the 360-degree panoramic image camera body, in order to form at least one selectively retrieved image, for being then stitched to and combined with the primitive 360-degree panorama image photographed and acquired by the 360-degree panoramic image camera body of Step (A) for combined output, and repeating Step (A); and (E) actuating the at least one mode selection indicia once to display the primitive 360-degree panorama image, and actuating the at least one mode selection indicia twice to select a combined output mode for displaying the selectively retrieved image in combination with the primitive 360-degree panorama image.

30. A 360-degree panorama image selective displaying method, comprising the following steps:
(a) displaying mode input selection, wherein at least one pressing touch operation is applied to a mode selection button arranged outside a 360-degree panoramic image camera body that is operable to photograph and acquire a 360-degree panorama image to input and select a mode of output of a primitive 360-degree panorama image or to output a selected direction subject image mode that an image of a selected photographed subject is stitched to the primitive 360-degree panorama image for output;
(b) identifying if the selected direction subject image mode is selected for output, wherein at least one image displaying processing unit arranged inside the 360-degree panoramic image camera body of Step (a) detects and determines if the mode selection button of Step (a) is touched and pressed down to select output of the primitive 360-degree panorama image mode or to select output of the selected direction subject image mode in which the selected photographed subject image is stitched to the primitive 360-degree panorama image for output, if yes, executing Step (c), and if not, executing Step (b1);
(b1) outputting the primitive 360-degree panorama image, wherein direct outputting is made for the primitive 360-degree panorama image photographed and acquired by the 360-degree panoramic image camera body of Step (a) to be directly outputted by the image displaying processing unit of Step (b), and repeating Step (a);
(c) identifying if a primary direction sensing signal is triggered and generated, wherein detection is made as to if a triggering section arranged in an annular configuration in a surrounding relationship with an outer circumference of a wide-angle lens module outside the 360-degree panoramic image camera body of Step (a) is subjected to a pressing touch operation applied by a user, and wherein when the triggering section is touched and pressed down by the user, at least one corresponding image direction sensing unit of a plurality of image direction sensing units of at least one displaying-position triggering sensing mechanism arranged inside the 360-degree panoramic image camera body in correspondence with the annularly contoured triggering section is triggered and to generate and output at least one primary direction sensing signal, and if yes, executing Step (d), and if not repeating Step (c);

(d) reading the primary direction sensing signal, wherein at least one direction calculation unit of the displaying-position triggering sensing mechanism arranged inside the 360-degree panoramic image camera body of Step (c) reads the primary direction sensing signal generated by the corresponding image direction sensing unit as being detected through triggering in Step (c);

(e) calculating and acquiring a triggering-position selection sensing signal corresponding to a direction of pressing touch, wherein the direction calculation unit of the displaying-position triggering sensing mechanism of Step (d) calculates and acquires a triggering-position selection sensing signal corresponding to pressing touch direction and position of the triggering section outside the 360-degree panoramic image camera body of Step (c); and (f) making an output of a combination, through cutting and stitching, of a primitive panoramic image and an image of a selected direction, wherein at least one image displaying processing unit arranged inside the 360-degree panoramic image camera body of Step (c) is operable, according to the triggering-position selection sensing signal that is calculated and acquired by the direction calculation unit of Step (e), to retrieve, enlarge, and cut an image of a photographed subject corresponding to a pressing touch position of the triggering section of Step (c) in the panoramic photograph taken by the 360-degree panoramic image camera body, in order to form at least one selectively retrieved image, for being then stitched to and combined with the primitive 360-degree panorama image photographed and acquired by the 360-degree panoramic image camera body of Step (c) for combined output, and repeating Step (a).

* * * * *